(12) United States Patent
Kumabe

(10) Patent No.: US 10,582,353 B2
(45) Date of Patent: Mar. 3, 2020

(54) WIRELESS COMMUNICATION DEVICE FOR VEHICLES AND WIRELESS COMMUNICATION SYSTEM

(71) Applicant: DENSO CORPORATION, Kariya, Aichi-pref. (JP)

(72) Inventor: Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 15/735,404

(22) PCT Filed: May 30, 2016

(86) PCT No.: PCT/JP2016/002610
§ 371 (c)(1),
(2) Date: Dec. 11, 2017

(87) PCT Pub. No.: WO2017/010035
PCT Pub. Date: Jan. 19, 2017

(65) Prior Publication Data
US 2018/0184271 A1    Jun. 28, 2018

(30) Foreign Application Priority Data
Jul. 10, 2015   (JP) ................................. 2015-138787

(51) Int. Cl.
*H04W 4/44*    (2018.01)
*H04W 72/04*   (2009.01)
(Continued)

(52) U.S. Cl.
CPC .............. *H04W 4/44* (2018.02); *G08G 1/095* (2013.01); *H04W 4/40* (2018.02); *H04W 72/0406* (2013.01); *G08G 1/096783* (2013.01)

(58) Field of Classification Search
None
See application file for complete search history.

(56) References Cited

U.S. PATENT DOCUMENTS 6,865,232 B1 *  3/2005  Isaksson ............... H04L 1/0025
                                                      375/260
8,761,676 B2    6/2014  Hu et al.
(Continued)

FOREIGN PATENT DOCUMENTS

JP    2005328283 A    11/2005
JP    2012528496 A    11/2012
(Continued)

*Primary Examiner* — Jamal Javaid
*Assistant Examiner* — Thad N Defauw
(74) *Attorney, Agent, or Firm* — Harness, Dickey & Pierce, P.L.C.

(57) ABSTRACT

A wireless communication device for vehicles, which is used in a vehicle and is able to designate a plurality of service channels, includes a first wireless receiver, a second wireless receiver, and a reception control unit. The first wireless receiver designates, as a reception channel, a service channel identified from the service channels based on a kind of a service, and receives service execution information to execute the service. The second wireless receiver designates, as a reception channel, a control channel having a frequency channel different from those of the service channels, and receives service announcement information containing channel information. The reception control unit causes the first wireless receiver to set the reception channel based on the channel information contained in the service announcement information received by the second wireless receiver.

16 Claims, 11 Drawing Sheets

(51) Int. Cl.
*H04W 4/40* (2018.01)
*G08G 1/095* (2006.01)
*G08G 1/0967* (2006.01)

(56) References Cited

U.S. PATENT DOCUMENTS

| | | | | |
|---|---|---|---|---|
| 2011/0294447 | A1* | 12/2011 | Hu | H04W 72/00 |
| | | | | 455/154.1 |
| 2011/0306353 | A1* | 12/2011 | Kim | H04W 48/18 |
| | | | | 455/452.2 |
| 2012/0134342 | A1 | 5/2012 | Le et al. | |
| 2012/0149389 | A1* | 6/2012 | Lin | H04W 74/002 |
| | | | | 455/456.1 |
| 2012/0188964 | A1 | 7/2012 | Zhang et al. | |
| 2013/0012253 | A1* | 1/2013 | Yamamoto | G08G 1/096716 |
| | | | | 455/509 |
| 2018/0159935 | A1* | 6/2018 | Cavalcanti | H04W 4/44 |

FOREIGN PATENT DOCUMENTS

| | | | |
|---|---|---|---|
| JP | 2013504231 A | 2/2013 | |
| WO | WO-2011111282 A1 | 9/2011 | |

\* cited by examiner

FIG. 8
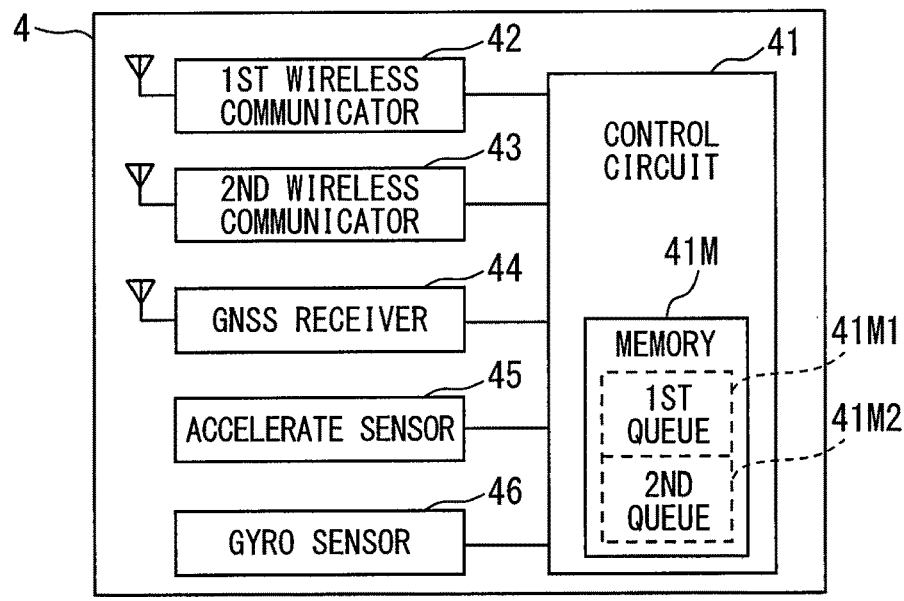
FIG. 9
| CH | CCH | SCH1 | SCH2 | SCH3 | SCH4 |
|----|-----|------|------|------|------|
| RF1 | ○ | ○ | ○ |  |  |
| RF2 | ○ |  |  | ○ | ○ |
FIG. 10
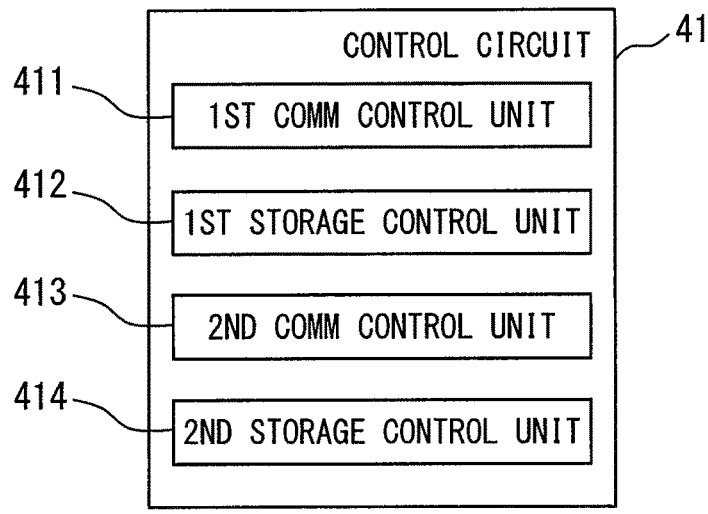

FIG. 16
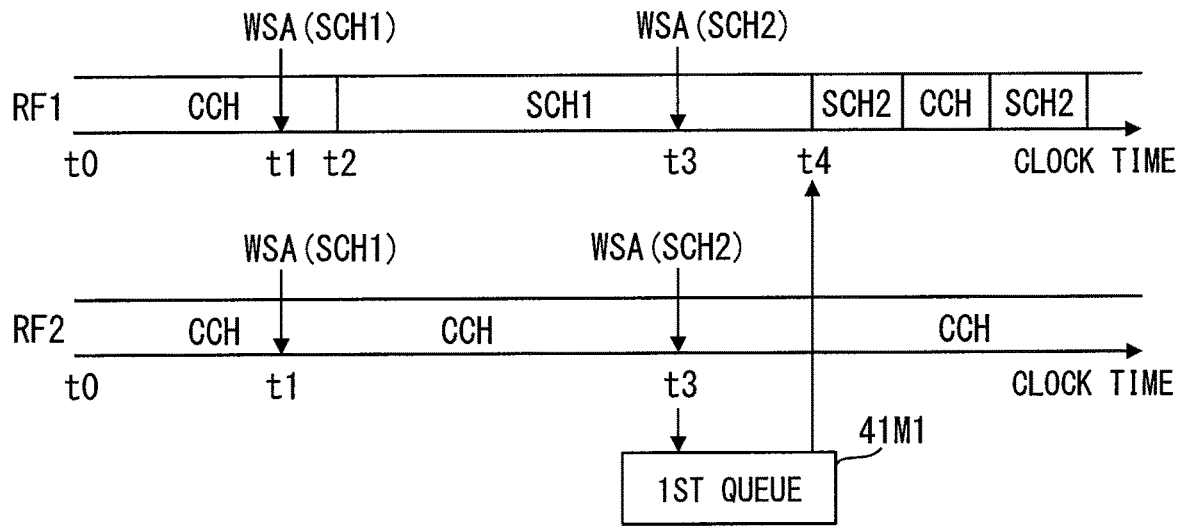
FIG. 17
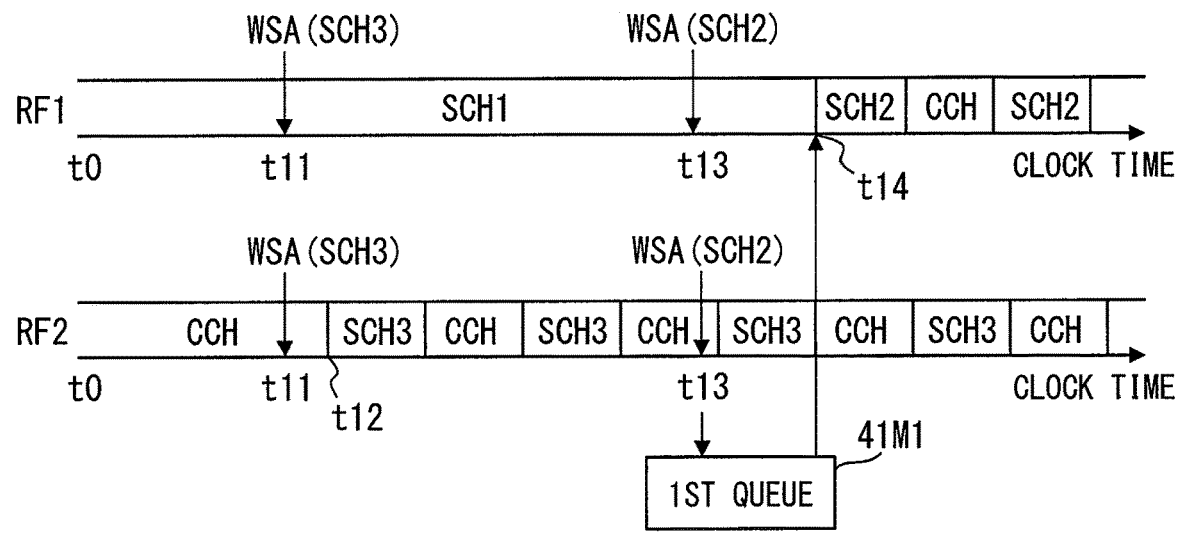
FIG. 18
| CH | CCH | SCH1 | SCH2 | SCH3 | SCH4 |
|---|---|---|---|---|---|
| RF1 | ○ | ○ | ○ | | |
| RF2 | ○ | ○ | ○ | ○ | ○ | able# WIRELESS COMMUNICATION DEVICE FOR VEHICLES AND WIRELESS COMMUNICATION SYSTEM

CROSS REFERENCE TO RELATED APPLICATIONS

This application is a U.S. National Phase Application under 35 U.S.C. 371 of International Application No. PCT/JP2016/002610 filed on May 30, 2016 and published in Japanese as WO 2017/010035 A1 on Jan. 19, 2017. This application is based on and claims the benefit of priority from Japanese Patent Application No. 2015-138787 filed on Jul. 10, 2015. The entire disclosures of all of the above applications are incorporated herein by reference.

TECHNICAL FIELD

The present disclosure relates to a wireless communication device for vehicles which is used in a vehicle, and a wireless communication system including the wireless communication device for vehicles.

BACKGROUND ART

There is known WAVE (Wireless Access in Vehicular Environments) as a telecommunication standard used for an intelligent transport system as disclosed in Patent literature 1.

WAVE uses two kinds of channels of a control channel and a service channel for a vehicular wireless communication device and a roadside unit to communicate with each other. The service channel is a channel used to transmit or receive the information for executing a service (i.e., service execution information, hereinafter). The service is provided as one of a plurality of kinds of services; the service channel is provided as one of a plurality of channels having mutually different frequencies. Each of the services is correspondingly associated with one of the service channels.

The control channel is a channel used for a roadside unit to transmit the various information (i.e., service announcement information, hereinafter) for announcement in order to perform communication with a vehicular wireless communication device via a service channel. To start the communication via a service channel, a reception channel that the vehicular wireless communication device uses for reception needs to be set to any one of the service channels. The service announcement information thus includes the information (channel information, hereinafter) for identifying a service channel designated as the reception channel.

PRIOR ART LITERATURES

Patent Literature

Patent literature 1: U.S. Pat. No. 8,761,676 B2

SUMMARY OF INVENTION

When the service channel is designated as the reception channel, any service announcement information cannot be received. If not receiving any service announcement information, the vehicular wireless communication device cannot designate, as the reception channel, a service channel identified from the channel information included in the service announcement information.

The present disclosure is made in consideration of the above situation. It is an object of the present disclosure to provide a wireless communication device for vehicles and a wireless communication system which can suppress a reception channel from failing to be set to a service channel identified from channel information.

To achieve the above object, according to a first aspect of the present disclosure, a wireless communication device for vehicles is provided to receive information using a plurality of service channels and a control channel, the service channels and the control channel which are assigned with a plurality of mutually different frequency channels. The wireless communication device includes a first wireless receiver, a second wireless receiver, and a reception control unit. The first wireless receiver designates, as a reception channel, a service channel identified from the plurality of service channels based on a kind of a service, and receives service execution information used to execute the service. The second wireless receiver designates, as a reception channel, the control channel, and receives service announcement information including channel information identifying the service channel. The reception control unit causes the first wireless receiver to set the reception channel based on the channel information included in the service announcement information received by the second wireless receiver.

The wireless communication device according to the first aspect includes two wireless receivers of a first wireless receiver and a second wireless receiver. The second wireless receiver, which designates the control channel as the reception channel, receives the service announcement information. The reception control unit causes the first wireless receiver to designate the reception channel based on the channel information included in the service announcement information received by the second wireless receiver.

Even if the first wireless receiver designates the service channel as the reception channel, the wireless communication device can thus receive the service announcement information via the control channel, and causes the first wireless receiver to designate the service channel identified from the channel information included in the service announcement information as the reception channel. This helps prevent the communication channel of the first wireless receiver from failing to be set to the service channel identified from the channel information.

In addition, according to a second aspect of the present disclosure, a wireless communication system is provided to include (i) the wireless communication device for vehicles according to the first aspect and (ii) an announcement roadside unit that transmits the service announcement information as well as the service execution information.

BRIEF DESCRIPTION OF DRAWINGS

The above and other objects, features and advantages of the present disclosure will become more apparent from the following detailed description made with reference to the accompanying drawings. In the drawings:

FIG. 8 is a block diagram illustrating a configuration of an in-vehicle unit;

FIG. 9 is a diagram illustrating frequency channels designated by a first wireless communicator and a second wireless communicator according to the first embodiment;

FIG. 10 is a block diagram illustrating functions of a control circuit in FIG. 8;

FIG. 16 is a diagram illustrating a time variation of communication channels of a first wireless communicator and a second wireless communicator according to the first embodiment;

FIG. 17 is a diagram illustrating a time variation of communication channels of a first wireless communicator and a second wireless communicator according to the first embodiment;

FIG. 18 is a diagram illustrating frequency channels designated by a first wireless communicator and a second wireless communicator according to a second embodiment;

EMBODIMENTS FOR CARRYING OUT INVENTION

First Embodiment

Figure 1:
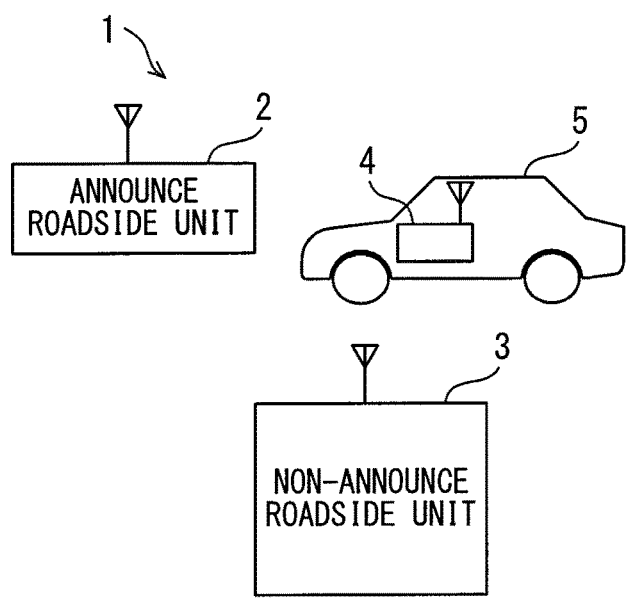
FIG. 1 is a diagram for explaining an overall configuration of a wireless communication system according to a first embodiment.

The following describes embodiments of the present disclosure with reference to drawings. As illustrated in FIG. 1, a wireless communication system 1 according to a first embodiment includes an announcement roadside unit 2, a non-announcement roadside unit 3, and an in-vehicle unit 4. The in-vehicle unit 4 is equivalent to a vehicular wireless communication device (i.e., a wireless communication device for vehicles).

[Brief Configuration of Wireless Communication System 1]

FIG. 1 illustrates a single announcement roadside unit 2; however, a plurality of announcement roadside units 2 may be included. In addition, FIG. 1 illustrates a single non-announcement roadside unit 3 and a single in-vehicle unit 4; however, a plurality of non-announcement roadside unit 3 or a plurality of in-vehicle unit 4 may be included. The announcement roadside unit 2, the non-announcement roadside unit 3, and the in-vehicle unit 4 each communicate in compliance with the standard of WAVE.

The wireless communication system 1 in compliance with the standard of WAVE is to specify communication channels including a single control channel and a plurality of service channels. Each of the control channel and the service channels is specified correspondingly with one of the predetermined frequency channels that are mutually different.

The announcement roadside unit 2 announces WSA (Wave Service Announcement) via the control channel. This WSA, which is equivalent to the service announcement information, includes the channel information or the information on service channel being a frequency channel that transmits the service execution information for executing a service. In addition, the announcement roadside unit 2 transmits the service execution information via the service channel announced with WSA. Note that "information," which may be used not only as an uncountable noun but also a countable noun, is equivalent to an information item. One information is equivalent to one information item; a plurality of informations are equivalent to a plurality of information items.

In contrast, the non-announcement roadside unit 3 does not transmit WSA (i.e., the service channel); the non-announcement roadside unit 3 transmits the service execution information via a service channel designated previously. Each of the announcement roadside unit 2 and the non-announcement roadside unit 3 may be movable or fixed to a roadside.

The in-vehicle unit 4, which is mounted in a vehicle 5, receives a WSA and the service execution information. The in-vehicle unit 4 also performs vehicle-to-vehicle communication with another in-vehicle unit 4. Note that the vehicle 5 may be one of various types of vehicles running roads such as a passenger car, a bus, a truck. FIG. 1 illustrates a four-wheel vehicle; however, the vehicle 5 may be two-wheel vehicle. The two-wheel vehicle may include a bicycle.

[Configuration of Announcement Roadside Unit 2]

The announcement roadside unit 2, which executes a road-to-vehicle communication with an in-vehicle unit 4 that is present in a wireless communication area formed by the announcement roadside unit 2, executes a predetermined service by transmitting various information to the in-vehicle unit 4 and acquiring the various information from the in-vehicle unit 4.

The announcement roadside unit 2 is installed in a position suitable for a service provided by the announcement roadside unit 2. For example, the announcement roadside unit 2 is provided in an intersection, a middle point between intersections connecting each other, a gateway to a specific facility (for example, a parking lot, a shop, a toll road), etc. The announcement roadside unit 2 provides a wireless communication area (i.e., an output of the electric wave transmitted by the announcement roadside unit 2) that is formed depending on a service provided by the announcement roadside unit 2. The wireless communication area, which is formed to be wider, may overlap with another wireless communication area by another announcement roadside unit 2 or a non-announcement roadside unit 3.

Figure 2:
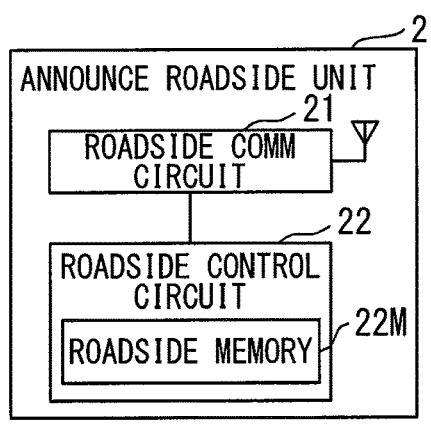
FIG. 2 is a diagram illustrating a configuration of an announcement roadside unit.

The announcement roadside unit 2 includes a roadside communication circuit 21 and a roadside control circuit 22 as in FIG. 2. The roadside communication circuit 21 and the roadside control circuit 22 are connected to communicate with each other.

The roadside communication circuit 21 executes a road-to-vehicle communication with an in-vehicle unit 4 that is present in a wireless communication area formed by the announcement roadside unit 2. The roadside communication circuit 21 demodulates a signal received from the in-vehicle unit 4 and outputs it to the roadside control circuit 22, while modulating a data inputted from the roadside control circuit 22 and converting to the electric waves to transmit.

The roadside communication circuit 21 is provided with two operation modes of a mode for communication using the control channel and a mode for communication using the service channel. That is, both the communication using the control channel and the communication using the service channel with the in-vehicle unit 4 are performed via the roadside communication circuit 21.

The roadside control circuit 22 is configured to be a usual computer including known components: a CPU; nonvolatile memory such as ROM and flash memory; volatile memory such as a RAM; an I/O; and a bus line that connects the foregoing components.

The roadside memory 22M included in the roadside control circuit 22 is a nonvolatile storage media, for example, a flash memory or ROM in the roadside control circuit 22. The roadside memory 22M stores data and program modules for executing the various processes, and the terminal ID assigned to the announcement roadside unit 2, etc. In addition, the roadside memory 22M further stores the information for generating a WSA.

Figure 3:
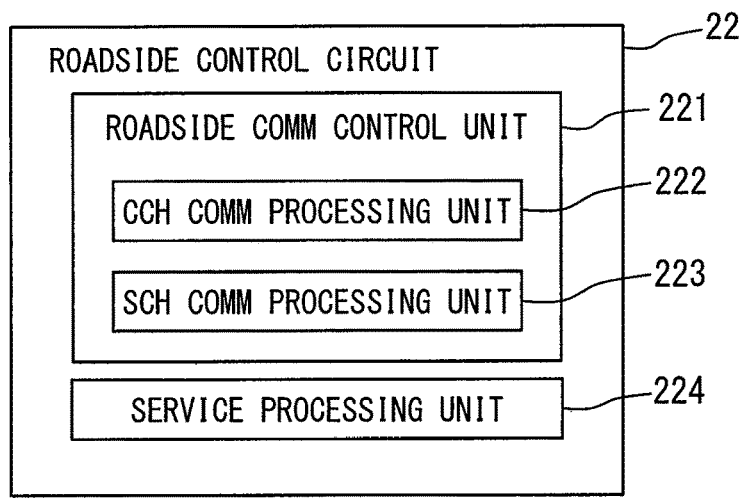
FIG. 3 is a block diagram illustrating functions of a roadside control circuit in FIG. 2.

The roadside control circuit 22 includes a roadside communication control unit 221 and a service processing unit 224 as functional blocks realized by executing the above-mentioned program modules, as in FIG. 3. All or part of the functions executed by the roadside control circuit 22 may be configured as hardware components such as one or more ICs.

The roadside communication control unit 221 controls an operation of the roadside communication circuit 21, and performs switching between the communication via the control channel and the communication via the service channel. The roadside communication control unit 221 generates the information to be transmitted from the roadside communication circuit 21 according to the operation mode of the roadside communication circuit 21, and transmits the generated information from the roadside communication circuit 21. In addition, the roadside communication control unit 221 acquires a data that the roadside communication circuit 21 receives, and provides the data to the service processing unit 224.

The roadside communication control unit 221 includes functional blocks of a CCH communication processing unit 222 and an SCH communication processing unit 223. Note that CCH signifies Control CHannel; SCH signifies Service CHannel.

The CCH communication processing unit 222 controls the communication using the control channel. The CCH communication processing unit 222 generates a WSA, designates the control channel as the transmission channel of the roadside communication circuit 21, and transmits the generated WSA to the roadside communication circuit 21 in a broadcasting mode. In addition, the CCH communication processing unit 222 acquires the data received by the roadside communication circuit 21 in the communication using the control channel, and provides the acquired data to the service processing unit 224.

The SCH communication processing unit 223 controls the communication using a predetermined service channel. The SCH communication processing unit 223 generates the service execution information, designates, as the transmission channel of the roadside communication circuit 21, a service channel identified depending on the kind of a service, and transmits the generated service execution information via the roadside communication circuit 21. The transmission mode may be selected from among broadcast, unicast, and multicast depending on the kind of the service. In addition, the SCH communication processing unit 223 acquires the data received by the roadside communication circuit 21 in the communication using the service channel, and provides the acquired data to the service processing unit 224.

The service processing unit 224 provides a predetermined service to an in-vehicle unit 4 present in a wireless communication area based on the data provided from the roadside communication control unit 221. The services include an automatic fee collection service during running a toll road, an automatic parking fee collection service at parking, a traffic information distribution service, a position information report service, and an advertisement distribution service.

Figure 4:
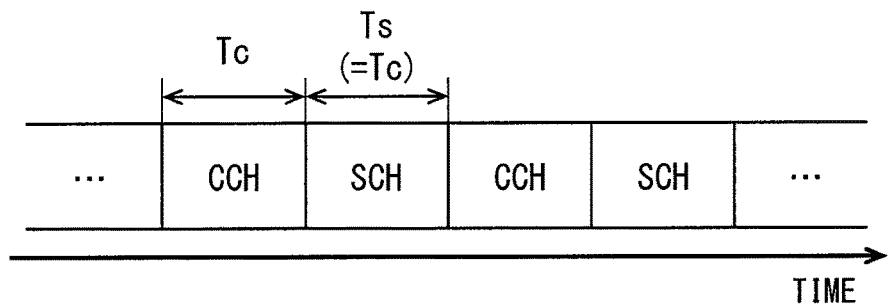
FIG. 4 is a schematic diagram illustrating an example of a sequence of communication executed by an announcement roadside unit.

FIG. 4 is a schematic diagram illustrating an example of a sequence of a communication executed by the announcement roadside unit 2. In the example illustrated in FIG. 4, the announcement roadside unit 2 executes alternately the communication using the control channel and the communication using the service channel, which are switched from each other each time a predetermined time (for example, 50 milliseconds) elapses.

The time Tc for continuing the communication using the control channel and the time Ts for continuing the communication using the service channel may be suitably designed, without being limited to the examples in FIG. 4. In addition, each of the time Tc or the time Ts may be changed dynamically if needed. Furthermore, another configuration may be provided which maintains the communication using the control channel until receiving, from the in-vehicle unit 4, a response to the WSA transmitted successively using the control channel.

Figure 5:
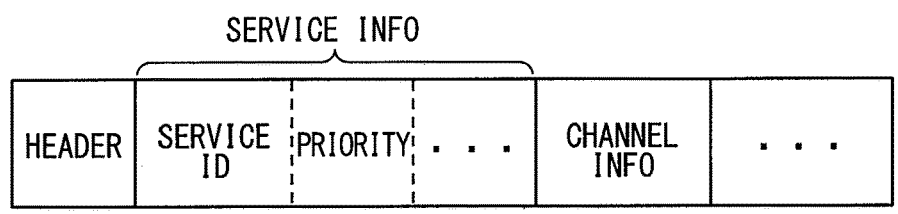
FIG. 5 is a diagram illustrating an example of a configuration of WSA.

As in FIG. 5, a WSA includes the header, the service information, and the channel information. The header is the information for an in-vehicle unit 4 serving as a receiving end to recognize that the received data is a WSA. The header includes (i) the information indicating the version of the WAVE standard, and (ii) the information for distinguishing the WSA from other information including the service execution information.

The service information is the information indicating the kind of a service provided by the announcement roadside unit 2. The service information indicates the kind of the service with a service ID previously assigned to each kind of the service. In addition, the priority of the service is also included. The in-vehicle unit 4 having received a WSA refers to the service information included in the WSA, thereby identifying the kind of the service corresponding to the WSA, i.e., the kind of the service provided by the announcement roadside unit 2 serving as a transmitting source of the WSA.

The channel information is the information containing a channel number of one of a plurality of service channels used by the announcement roadside unit 2 for providing a service. The service channel may be determined depending on a service that is provided; an identical service channel may be assigned to a plurality of services. The in-vehicle unit 4 refers to this channel information, thereby identifying the service channel used for the announcement roadside unit 2 to provide a service.

[Configuration of Non-Announcement Roadside Unit 3]

Figure 6:
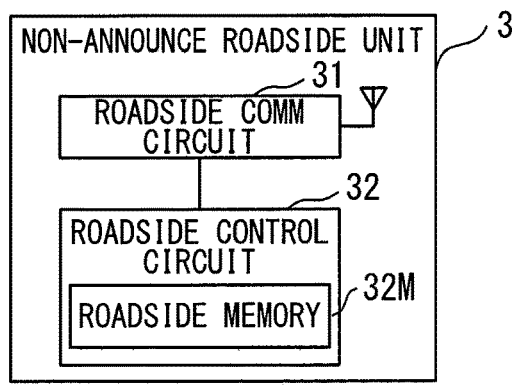
FIG. 6 is a diagram illustrating a configuration of a non-announcement roadside unit.

The non-announcement roadside unit 3 is different from the announcement roadside unit 2 in not transmitting a WSA being the service announcement information, while being the same as the announcement roadside unit 2 in other portions. Therefore, the non-announcement roadside unit 3 includes a roadside communication circuit 31 and a roadside control circuit 32, as illustrated in FIG. 6, similar to the announcement roadside unit 2. In addition, the roadside control circuit 32 includes a roadside memory 32M.

However, the non-announcement roadside unit 3 does not transmit any WSA; the roadside communication circuit 31 is provided with a mode for communication using the service channel without a mode for communication using the control channel.

Figure 7:
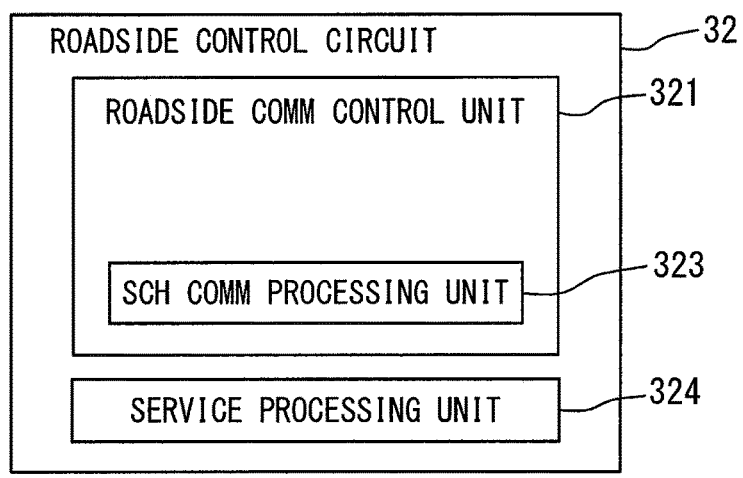
FIG. 7 is a block diagram illustrating functions of a roadside control circuit in FIG. 6.

FIG. 7 illustrates the functional blocks achieved by the roadside control circuit 32 executing the program module stored in the roadside memory 32M. As in FIG. 7, the roadside control circuit 32 includes a roadside communication control unit 321 and a service processing unit 324.

The roadside communication control unit 321 includes an SCH communication processing unit 323, but does not include any CCH communication processing unit since the non-announcement roadside unit 3 does not transmit any WSA. The function of the SCH communication processing unit 323 is the same as that of the SCH communication processing unit 223 included in the announcement roadside unit 2. Further, the function of the service processing unit 324 is the same as that of the service processing unit 224 included in the announcement roadside unit 2.

[Configuration of in-Vehicle Unit 4]

The following explains a configuration of an in-vehicle unit 4. As in FIG. 8, the in-vehicle unit 4 includes a control circuit 41, a first wireless communicator 42, a second wireless communicator 43, a GNSS receiver 44, an acceleration sensor 45, and a gyro sensor 46. The control circuit 41 is connected to perform a two-way communication with each of the first wireless communicator 42, the second wireless communicator 43, the GNSS receiver 44, the acceleration sensor 45, and the gyro sensor 46.

The first wireless communicator 42 is equivalent to a first wireless receiver; the second wireless communicator 43 is equivalent to a second wireless receiver. The first wireless communicator 42 designates, as the communication channel, one frequency channel selected by switching a plurality of frequency channels. The communication channel is a channel which performs reception and transmission. That is, the communication channel signifies a reception channel and a transmission channel.

The second wireless communicator 43 designates, as the communication channel, one frequency channel selected by switching a plurality of frequency channels. FIG. 9 illustrates frequency channels designated by the first wireless communicator 42 or the second wireless communicator 43 in the first embodiment.

The first wireless communicator 42 and the second wireless communicator 43 each demodulate a signal received via an antenna and output it to the control circuit 41, while modulating a data inputted from the control circuit 41 and converting to the electric waves to transmit.

In FIG. 9, CCH signifies Control CHannel; SCH signifies Service CHannel. These channels each belong to 5.8 GHz band or 5.9 GHz band in the present embodiment. In addition, RF 1 represents the first wireless communicator 42; RF 2 represents the second wireless communicator 43. In the present embodiment, the service channels are provided as four channels SCH1 to SCH4. These four service channels are all the service channels used in the wireless communication system 1 in the present embodiment.

In FIG. 9, circle marks each signify a communication channel that can be designated by the first wireless communicator 42 or the second wireless communicator 43. Thus, the first wireless communicator 42 can designate three communication channels of the control channel, the first service channel SCH1, and the second service channel SCH2. In contrast, the second wireless communicator 43 can designate three communication channels of the control channel, the third service channel SCH3, and the fourth service channel SCH4.

The GNSS receiver 44 receives the electric waves from the satellites used by GNSS (Global Navigation Satellite System), and acquires a data indicating a current position of the GNSS receiver 44. The current position information acquired by the GNSS receiver 44 indicates a latitude and longitude, for example. The current position information acquired by the GNSS receiver 44 is provided to the control circuit 41 successively (e.g., each 100 milliseconds). In addition, the electric wave received by the GNSS receiver 44 is used further for the amendment of a clock (unshown) included in the in-vehicle unit 4.

The acceleration sensor 45 detects an acceleration in a forth-and-back direction of a host vehicle. The in-vehicle unit 4 is attached to the host vehicle with a predetermined posture such that the detecting direction of the acceleration by the acceleration sensor 45 accords with the forth-and-back direction of the host vehicle. This host vehicle refers to a vehicle in which the in-vehicle unit 4 is mounted. In addition, the acceleration sensor 45 may be a three-axial acceleration sensor that detects accelerations which act on three axial directions mutually orthogonal such as the forth-and-back direction, the left-and-right direction, and the up-and-down direction of the host vehicle.

The gyro sensor 46 detects an angular rate about the vertical axis of the host vehicle under the state where the in-vehicle unit 4 is attached with a predetermined posture. The acceleration sensor 45 and the gyro sensor 46 are used for determining an assumed position of the in-vehicle unit 4.

The control circuit 41 is configured to be a usual computer including known components (none shown): a CPU; nonvolatile memory such as ROM and flash memory; volatile memory such as a RAM; an I/O; and a bus line that connects the foregoing components.

The memory 41M included in the control circuit 41 is a nonvolatile storage media, for example, a flash memory or ROM in the control circuit 41. The memory 41M stores data and program modules for executing the various processes, and the terminal ID assigned to the in-vehicle unit 4, etc.

In addition, the memory 41M includes a first queue 41M1 and a second queue 41M2 as examples of a storage. The first queue 41M1 is a queue storing a WSA containing the channel number corresponding to the service channel which can be designated by the first wireless communicator 42. The second queue 41M2 is a queue storing a WSA containing the channel number corresponding to the service channel which can be designated by the second wireless communicator 43.

As in FIG. 10, the control circuit 41 includes a first communication control unit 411, a first storage control unit 412, a second communication control unit 413, and a second storage control unit 414 as functional blocks realized by executing the above-mentioned program modules. The first communication control unit 411 is equivalent to a first reception control unit; the second communication control unit 413 is equivalent to a second reception control unit. All or part of the functions executed by the control circuit 41 may be configured as hardware components such as one or more ICs.

The first communication control unit 411 controls operations of the first wireless communicator 42. In detail, either the control channel or the service channel is designated as the communication channel, via which the communication is performed, of the first wireless communicator 42. When not designating the service channel as the communication channel of the first wireless communicator 42, the control channel is thus designated as the communication channel. The processes executed by the first communication control unit 411 will be explained with the flowcharts in FIG. 11 to FIG. 14.

When either the first wireless communicator 42 or the second wireless communicator 43 receives a WSA, the first storage control unit 412 determines whether to store the received WSA in the first queue 41M1. In addition, the first storage control unit 412 determines successively whether to hold or erase the WSA stored in the first queue 41M1. The processes executed by the first storage control unit 412 will be explained with the flowcharts in FIG. 11 to FIG. 15.

The second communication control unit 413 controls operations of the second wireless communicator 43. The control contents executed by the second communication control unit 413 is the same as those executed by the first communication control unit 411 for the first wireless communicator 42.

The second storage control unit 414 determines whether to store a WSA in the second queue 41M2, while determining successively whether to hold or erase the WSA stored in the second queue 41M2. The processes performed by the second storage control unit 414 for the second queue 41M2 is the same as the processes performed by the first storage control unit 412 for the first queue 41M1.

[Process by Control Circuit 41]

The first communication control unit 411 and the first storage control unit 412 control the first wireless communicator 42, while executing the processes in FIG. 11 to FIG. 15 periodically to update the memory content in the first queue 41M1. The second communication control unit 413 and the second storage control unit 414 control the second wireless communicator 43, while executing the processes in FIG. 11 to FIG. 15 periodically to update the memory content in the second queue 41M2.

Among the processes in FIG. 11 to FIG. 14, S4, S12, S14, S16, S18, S20, S54, S56, S58, S60, S72, and S78 are performed by the first storage control unit 412 and the second storage control unit 414, whereas the others are performed by the first communication control unit 411 and the second communication control unit 413.

Figure 11:
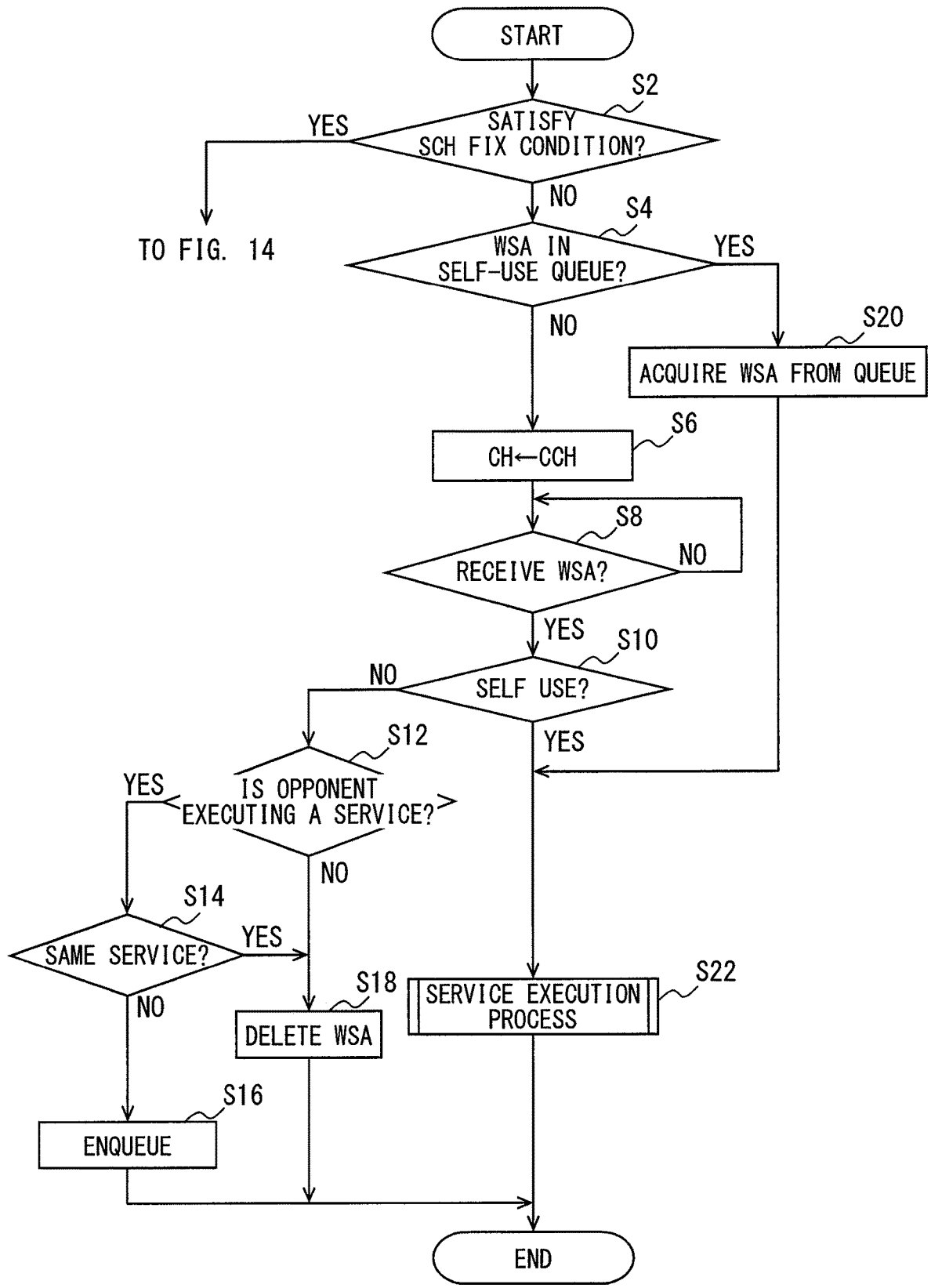
FIG. 11 is a flowchart illustrating a process executed by a control circuit in FIG. 8.

In FIG. 11, at S2, it is determined whether an SCH fixation condition is satisfied. This SCH fixation condition is a condition to fix the communication channel of the second wireless communicator 43 to a single service channel. The reason for determining such SCH fixation condition is as follows. The wireless communication system 1 according to the present embodiment includes a non-announcement roadside unit 3 that does not transmit a WSA. The in-vehicle unit 4 communicating with the non-announcement roadside unit 3 may be thus desirable to fix the communication channel to the service channel via which the non-announcement roadside unit 3 communicates.

The SCH fixation condition is previously specified. The SCH fixation condition is satisfied when the in-vehicle unit 4 is located in a predetermined SCH fixed area, or when the in-vehicle unit 4 is during a period of time from when it is powered on to when a WSA becomes stored in the first queue 41M1 corresponding to the first wireless communicator 42.

Figure 14:
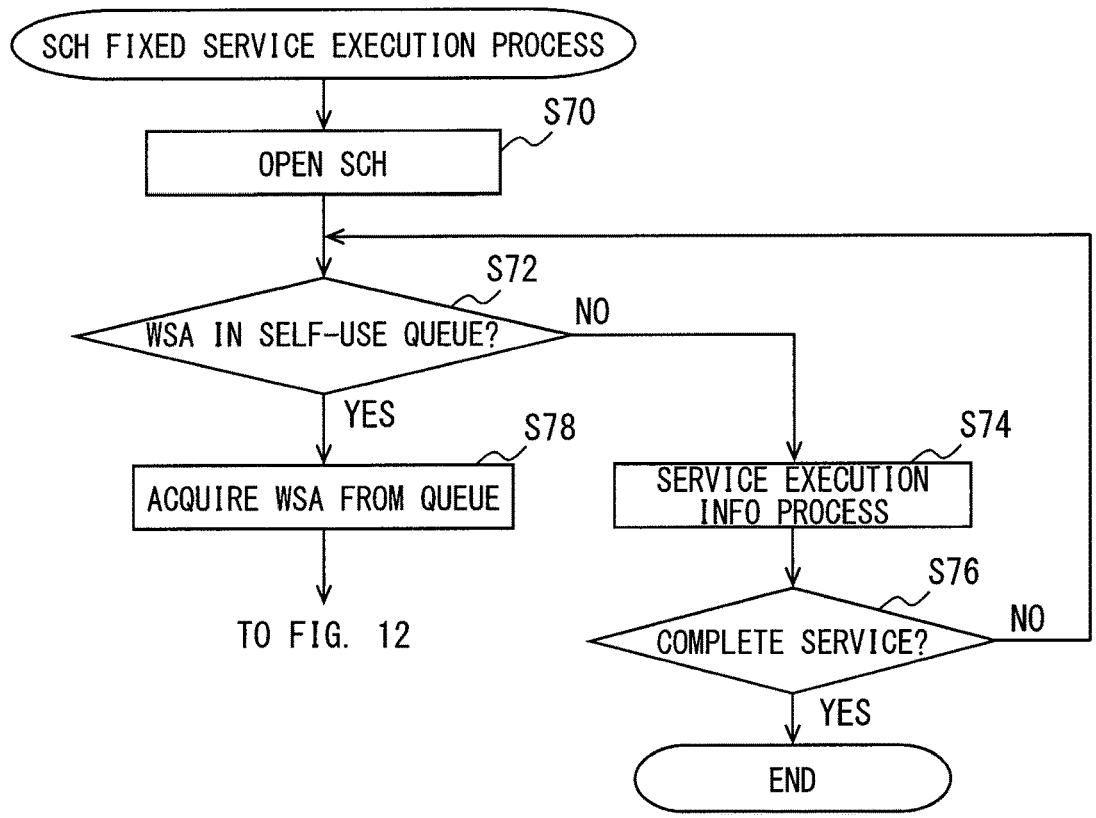
FIG. 14 is a flowchart illustrating in detail a process executed in response to YES at the determination at S2 in FIG. 11.

When the SCH fixation condition is satisfied, the determination at S2 is made YES, advancing the sequence to the SCH fixed service execution process in FIG. 14. This SCH fixed service execution process is mentioned later. When the SCH fixation condition is not satisfied, the sequence proceeds to S4.

At S4, it is determined whether a WSA is stored in a self queue. This self queue is the first queue 41M1 for the first communication control unit 411 controlling the first wireless communicator 42; the self queue is the second queue 41M2 for the second communication control unit 413 controlling the second wireless communicator 43. The process, which stores a WSA in the first queue 41M1 or the second queue 41M2, is performed at S16 in FIG. 11 or in the CCH reception process in FIG. 13. If the determination at S4 is made NO, the sequence proceeds to S6.

At S6, the communication channel of a wireless communicator being a control target is set to the control channel. This control-target wireless communicator is either the first wireless communicator 42 for the first communication control unit 411 or the second wireless communicator 43 for the second communication control unit 413.

At S8, it is determined whether the control-target wireless communicator receives a WSA. When this determination is made NO, S8 is repeatedly performed. When the determination at S8 is made YES, the sequence proceeds to S10.

At S10, it is determined whether the WSA received by the control-target wireless communicator is a self-use WSA. As in FIG. 9, the first wireless communicator 42 can designate the service channels SCH1 and SCH2 as the communication channel. For the first communication control unit 411 controlling the first wireless communicator 42, a WSA whose channel information is the service channel SCH1 or the service channel SCH2 is a self-use WSA. For the second communication control unit 413 controlling the second wireless communicator 43, a WSA whose channel information is the service channel SCH3 or the service channel SCH4 is a self-use WSA. When the determination at S10 is made YES, the sequence proceeds to S22; when NO, it proceeds to S12.

At S12, it is determined whether an opponent party is executing some service. For the first communication control unit 411, an opponent party is the second communication control unit 413; for the second communication control unit 413, an opponent party is the first communication control unit 411. When the opponent-party communication control unit 411, 413 is executing either a service execution process at S22 or the SCH fixed service execution process in FIG. 14, the determination at S12 is made YES, advancing the sequence to S14.

At S14, it is determined whether the opponent party is executing the same service as a service identified from the service ID of the WSA that is determined to be received at S8. This determination is performed by determining which channel is designated as the communication channel of the control-target wireless communicator 42, 43 of the opponent-party communication control unit 411, 413. When the determination at S14 is made NO, the sequence proceeds to S16.

At S16, the WSA that is determined to be received at S8 is stored in the second queue 41M2 (i.e., an opponent-party queue for the first communication control unit 411), or the first queue 41M1 (i.e., an opponent-party queue for the second communication control unit 413). This allows the first communication control unit 411 controlling the first wireless communicator 42 to acquire the WSA from the first queue 41M1 and start the process for executing a new service, even if the first wireless communicator 42 cannot receive the WSA.

In contrast, when the determination at S14 is made YES or when the determination at S12 is made NO, the sequence proceeds to S18. At S18, the WSA received this time is deleted. When the determination at S12 is made NO, the opponent party is not executing any service; thus, the opponent-party wireless communicator 42, 43 is designating the control channel CCH as the communication channel and should have received the WSA. In addition, when the opponent party is executing the same service as the service identified from the service ID of the WSA received this time, the WSA received this time is unnecessary. When the determination at S14 is made YES, or when the determination at S12 is made NO, the WSA received this time is thus deleted.

When S16 or S18 is completed, the process in FIG. 11 is ended. If the process in FIG. 11 is ended, the process starts again from S2 after a fixed time lapse.

When the determination at S4 is made YES, i.e., the WSA is determined to be stored in the self-use queue, the sequence proceeds to S20. At S20, the WSA is acquired from the self-use queue. The WSA acquired is deleted from the queue. When a plurality of WSA(s) are stored in the self-use queue, the WSA having an oldest reception clock time is acquired in the present embodiment. After acquiring the WSA, the sequence proceeds to S22.

At S22, the service execution process is performed. This service execution process is to receive the service execution information transmitted by the announcement roadside unit 2 or the non-announcement roadside unit 3 and thereby execute a predetermined service. This service execution process is illustrated in FIG. 12 in detail.

Figure 12:
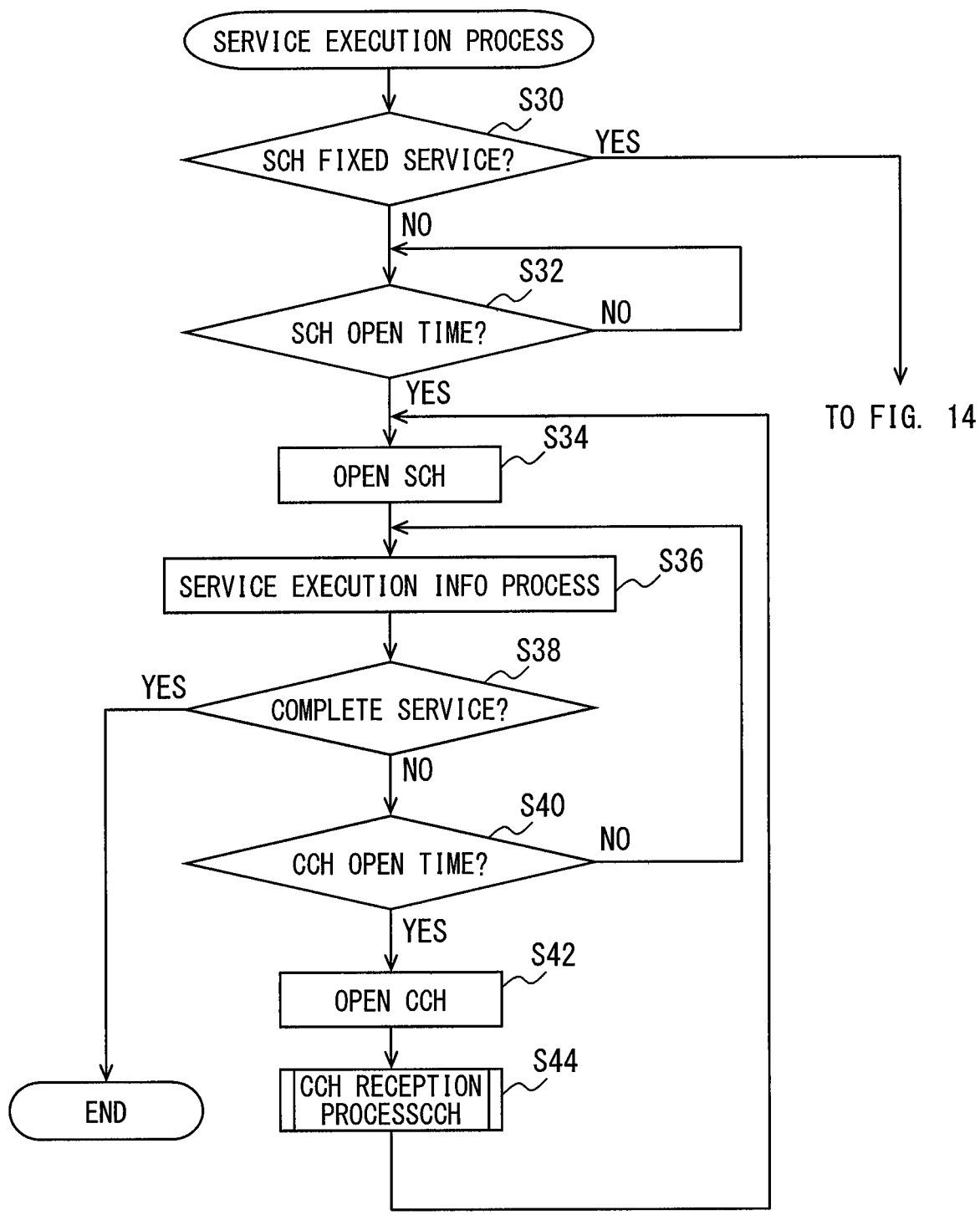
FIG. 12 is a flowchart illustrating in detail a process at S22 in FIG. 11.

In FIG. 12, at S30, it is determined whether the service is an SCH fixed service. In detail, it is determined whether the service ID included in the WSA is the service ID of a service specified as an SCH fixed service. When the determination at S30 is made YES, the sequence proceeds to FIG. 14. When the determination at S30 is made NO, the sequence proceeds to S32.

When proceeding to S32, the communication is made with the announcement roadside unit 2. At S32, it is determined whether it is the clock time for opening the service channel. This "opening" signifies designating the communication channel. The clock time for opening the service channel is determined from the WSA. The WSA includes the information requiring an immediate opening of the service channel, if such an immediate opening is necessary. When the information requiring the immediate opening of the service channel is included in the WSA, the determination at S32 is promptly made YES. In addition, when the information requiring the immediate opening of the service channel is not included in the WSA, the WSA includes a clock time for opening the service channel. When a clock time for opening the service channel is included in the WSA, it is determined at S32 whether such a clock time comes.

When the determination at S32 is made NO, S32 is repeatedly performed. When the determination at S32 is made YES, the sequence proceeds to S34.

At S34, the communication channel of the control-target wireless communicator 42, 43 is set to the service channel identified from the channel information included in the WSA. At S36, the service execution information process is performed. The service execution information process is to execute the service identified from the service execution information when this service execution information is received by the control-target wireless communicator 42, 43.

When the service is completed, the service execution information received by the control-target wireless communicator 42, 43 includes the information indicating completion of the service. At S38, it is determined whether the service is completed or not. This determination is to determine whether the service execution information includes the information indicating the completion of the service. When the determination at S38 is made YES, the service execution process in FIG. 12 is ended. After the service execution process is completed, the process in FIG. 11 is also ended.

When the determination at S38 is made NO, the sequence proceeds to S40. At S40, it is determined whether it is a clock time for opening the control channel. The clock time for opening the control channel is determined from the WSA. The WSA may sometime include the information indicating a period of time for which the service channel is opened. When the WSA includes the information indicating a period of time for which the service channel is opened, it is determined that the clock time for opening the control channel will come after a period of time determined from the information included in the WSA. By contrast, when the WSA does not include the information indicating a period of time for which the service channel is opened, it is determined that the clock time for opening the control channel will come when the time Ts in FIG. 4 elapses since the opening of the service channel. This is because the communication channel is switched to synchronize with the announcement roadside unit 2.

When the determination at S40 is made NO, the sequence returns to S36 to continue the service execution information process. When the determination at S40 is made YES, the sequence proceeds to S42. At S42, the communication channel of the control-target wireless communicator 42, 43 is set to the control channel.

At S44, the CCH reception process is executed. The CCH reception process is to be executed during a period of time for which the communication channel is set to the control channel. The details of the CCH reception process is illustrated in FIG. 13.

Figure 13:
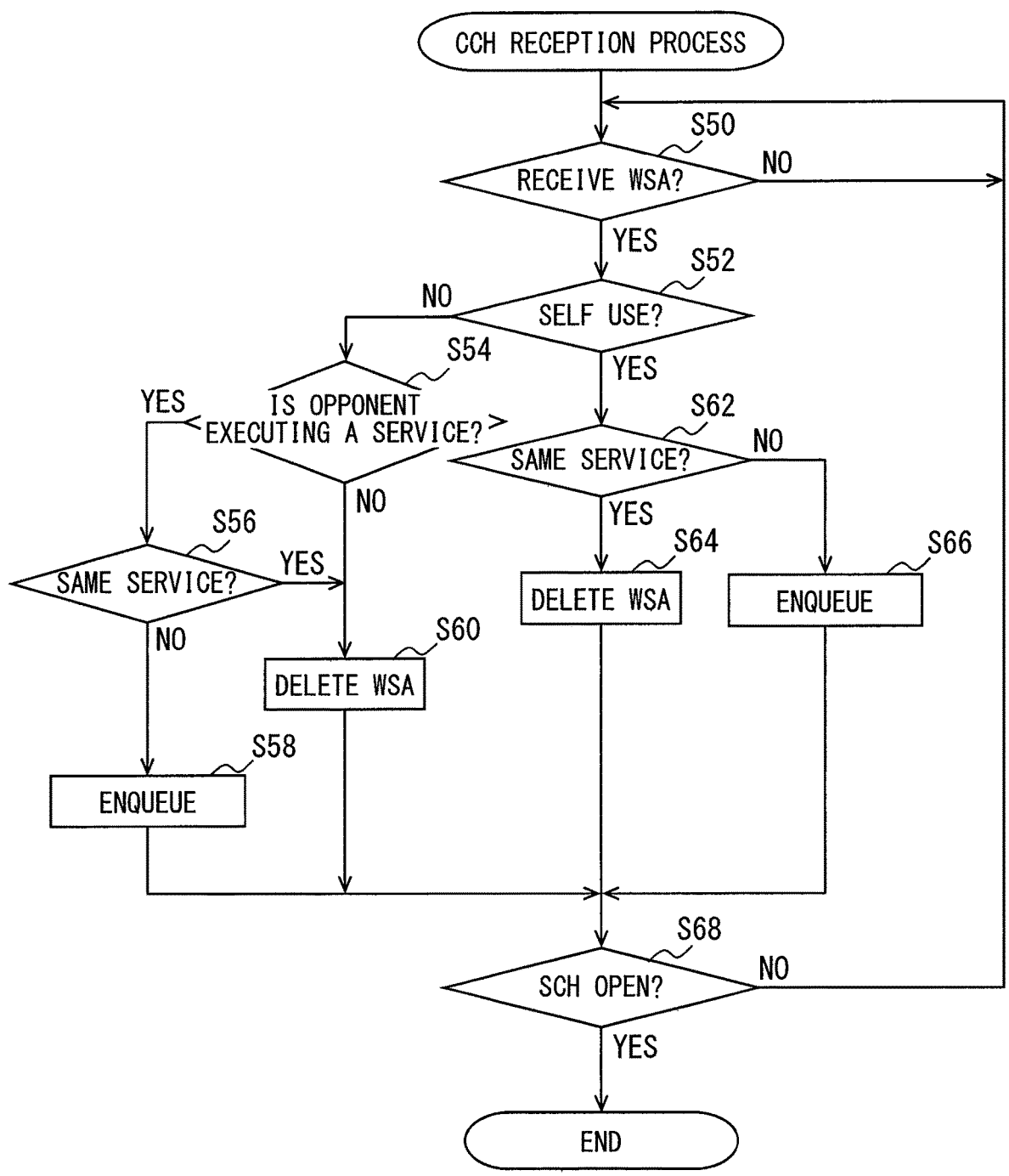
FIG. 13 is a flowchart illustrating in detail a process at S44 in FIG. 12.

In FIG. 13, S50, S52, S54, S56, S58, and S60 are the same processes as S8, S10, S12, S14, S16, and S18 in FIG. 11, respectively. Thus, a WSA is received and then stored in the queue 41M1, 41M2 when all the following conditions are simultaneously fulfilled: the received WSA is not a self use; the received WSA is not received by the opponent party; and the opponent party is not executing the service identified from the received WSA.

When the determination at S52 is made YES (i.e., when the WSA received by the control-target wireless communicator 42, 43 is a self use), the sequence proceeds to S62. At S62, it is determined whether the service represented by the service ID included in the received WSA is the same as the service currently executed, and is the same as the WSA stored in the self-use queue. When it is determined that the service represented by the service ID included in the received WSA is the same as the service currently executed, or is the same as the WSA stored in the self-use queue, the determination at S62 is made YES. When the determination at S62 is made YES, the sequence proceeds to S64. At S64, the WSA received this time is deleted.

When the determination at S62 is made NO, the sequence proceeds to S66. At S66, the WSA received this time is stored in the self-use queue. When a WSA is already stored in the self-use queue, this WSA stored already is maintained to be stored and the WSA is stored anew in the self-use queue.

When any one of S58, S60, S64, and S66 is executed, the sequence proceeds to S68. At S68, it is determined whether to open the service channel. This determination is made YES when the period of time for which the control channel is opened elapses. In addition, when a clock time for opening the service channel is included in the WSA received this time and such a clock time comes, the determination at S68 is made YES. Furthermore, also when the information requiring the immediate opening of the service channel is included in the WSA received this time, the determination at S68 is made YES. Further, when the information requiring the immediate opening of the service channel is included in the WSA received this time, the service channel may be opened without executing S66.

When the determination at S68 is made NO, the sequence returns to S50; when YES, the process in FIG. 13 is ended. When the process in FIG. 13 is ended, the sequence proceeds to S34 in FIG. 12.

The following explains the case when the determination at S2 in FIG. 11 is made YES, i.e., when the SCH fixation condition is satisfied. When the SCH fixation condition is satisfied, the SCH fixed service execution process in FIG. 14 is executed.

In FIG. 14, as S70, the service channel previously designated for executing the SCH fixed service is opened. At S72, it is determined whether a WSA is stored in the self-use queue. If this determination is made NO, the sequence proceeds to S74.

At S74, the service execution information process is performed. This process is the same as that at S36. At S76, it is determined whether the service is completed or not. This process is the same as that at S38. When the determination at S76 is made YES, i.e., when the completion of the service is determined, the process in FIG. 14 is ended. In this case, the process starts again from S2 after a fixed time lapse.

When the determination at S76 is made NO, the sequence returns to S72. When the determination at S72 is made YES, the sequence proceeds to S78. At S78, the WSA is acquired from the self-use queue. The WSA that is acquired at this time is deleted from the queue. When a plurality of WSA(s) are stored in the self-use queue, the WSA having an oldest reception clock time is acquired. When the WSA is acquired, the sequence proceeds to the service execution process in FIG. 12. Therefore, for example, even if the communication channel of the first wireless communicator 42 is fixed to the service channel, the sequence can proceed to the next service using the first wireless communicator 42.

Figure 15:
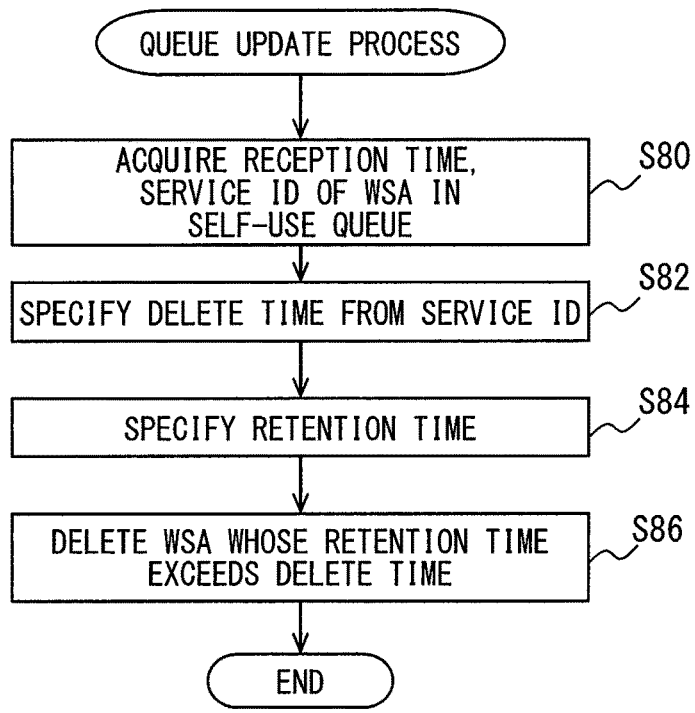
FIG. 15 is a flowchart illustrating a process executed by a control circuit in FIG. 8 in addition to the processes in FIGS. 11 to 14.

In addition, the first storage control unit 412 and the second storage control unit 414 also execute periodically the queue update process in FIG. 15. However, either the first storage control unit 412 or the second storage control unit 414 may execute the queue update process in FIG. 15 to each of the first queue 41M1 and the second queue 41M2.

In FIG. 15, at S80, a reception clock time and a service ID of the WSA stored in the self-use queue are acquired. At S82, a deleting time being a period of time for deleting the WSA stored in the self-use queue is determined using (i) the service ID acquired at S80 and (ii) the predetermined relation specifying the deletion time based on the service ID. This relation is predetermined such that as the service is more important, the deletion time is longer.

At S84, the retention time being a period of time for which the WSA is stored in the queue is determined, with respect to each WSA, from the difference between the present clock time and the reception clock time acquired at S80.

S86 deletes (i.e., from the queue) the WSA whose retention time determined at S84 exceeds the deletion time determined at S82.

[Time Variation of Communication Channels in First Embodiment]

Each of FIG. 16 and FIG. 17 is a diagram illustrating a time variation of communication channels of the first wireless communicator 42 and the second wireless communicator 43 according to the first embodiment. In FIGS. 16 and 17, RF1 and RF2 signify the first wireless communicator 42 and the second wireless communicator 43, respectively; CCH signifies the control channel and SCH signifies the service channel. In addition, the clock time t0 is the time of being powered on.

First, an example in FIG. 16 will be explained. At the clock time t0, the communication channel of each of the first wireless communicator 42 and the second wireless communicator 43 is set to the control channel. At the clock time t1, a WSA is transmitted from the announcement roadside unit 2. Both the first wireless communicator 42 and the second wireless communicator 43 receive the WSA since the communication channel of each of the first wireless communicator 42 and the second wireless communicator 43 is set to the control channel at the clock time t1.

This WSA includes the service channel SCH1 as the channel information. The service channel SCH1 is a channel which can be designated by the first wireless communicator 42. In addition, in this example of FIG. 16, the first service channel SCH1 is a service channel which performs an SCH fixed service. The first wireless communicator 42 thus designates, as the communication channel, the first service channel SCH1 from the clock time t2 when S32 in FIG. 12 is made YES. In contrast, the second wireless communicator 43 does not change the communication channel at the clock time t1, even if receiving the WSA.

At the clock time t3, a WSA including the second service channel SCH2 as the channel information is transmitted from a different announcement roadside unit 2 different from the announcement roadside unit 2 which transmits the WSA at the clock time t1. Such a situation takes place when the wireless communication areas of two announcement roadside units 2 overlap with each other.

Since the first wireless communicator 42 fixes the communication channel to the first service channel SCH1, the first wireless communicator 42 cannot receive the WSA transmitted at the clock time t3. By contrast, since the second wireless communicator 43 designates, as the communication channel, the control channel, the second wireless communicator 43 can receive the WSA transmitted at the clock time t3. This WSA including the second service channel SCH2 as the channel information; the second service channel SCH2 is not a communication channel designated by the second wireless communicator 43 but is a communication channel designated by the first wireless communicator 42. This WSA is thus stored in the first queue 41M1.

The communication by the first wireless communicator 42 designating, as the communication channel, the first service channel SCH1 is ended at the clock time t4. At this time, the WSA including the second service channel SCH2 as the channel information is stored in the first queue 41M1. The first communication control unit 411 thus acquires the WSA from the first queue 41M1 at the clock time t4, and designates, as the communication channel, the second service channel SCH2.

Therefore, even if the first wireless communicator 42 cannot receive the WSA at the clock time t3, the in-vehicle unit 4 can designate, as the communication channel of the first wireless communicator 42, the second service channel SCH2 represented by the WSA transmitted from the announcement roadside unit 2 at the clock time t3. The service using the second service channel SCH2 is supposed not to be an SCH fixed service. Thus, the first wireless communicator 42 designates, as the communication channel, alternately either the second service channel SCH2 or the control channel after the clock time t4.

The following explains a process in FIG. 17. In the example of FIG. 17, the SCH fixation condition fixing the communication channel of the first wireless communicator 42 to the first service channel SCH1 is supposed to be satisfied at the time of being powered on. Therefore, the first wireless communicator 42 has been fixed the communication channel to the first service channel SCH1 since the clock time t0 of being powered on. In contrast, the second wireless communicator 43 is designating, as the communication channel, the control channel.

At the clock time t11, the WSA including the third service channel SCH3 as the channel information is transmitted from the announcement roadside unit 2. This WSA is received by the second wireless communicator 43. Thereby, the second wireless communicator 43 receives the service reception information via the third service channel SCH3 from the time t12, while switching the communication channel alternately between the third service channel SCH3 and the control channel.

At the clock time t13, a WSA including the second service channel SCH2 as the channel information is transmitted from a different announcement roadside unit 2 different from the announcement roadside unit 2 which transmits the WSA at the clock time t11. Since the first wireless communicator 42 fixes the communication channel to the first service channel SCH1, the first wireless communicator 42 cannot receive the WSA. In contrast, since the second wireless communicator 43 designates, as the communication channel, the control channel at the clock time t13, the second wireless communicator 43 receives the WSA at the clock time t13.

As also explained in FIG. 16, this WSA is thus stored in the first queue 41M1. At this time, the first communication control unit 411 performs the SCH fixed service execution process as in FIG. 14. Even in this SCH fixed service execution process, the WSA is determined whether to be stored in the self-use queue at S72. Therefore, when a WSA is stored in the first queue 41M1 at the clock time t13, the WSA will be acquired by the first communication control unit 411.

Thereby, even if the first wireless communicator 42 does not receive a WSA, the first communication control unit 411 can cause the first wireless communicator 42 to designate, as the communication channel, the second service channel SCH2 from the clock time t14. The clock time t14 is the time of completing the communication by the first wireless communicator 42 designating, as the communication channel, the first service channel SCH1.

Summary of First Embodiment

As mentioned above, the in-vehicle unit 4 according to the first embodiment is provided with two wireless communicators of the first wireless communicator 42 and the second wireless communicator 43. The second wireless receiver 43, which designates the control channel as the communication channel, receives the WSA. The first communication control unit 411 causes the first wireless communicator 42 to se the communication channel based on the WSA received by the second wireless communicator 43.

Therefore, even if the first wireless communicator 42 is designating, as the communication channel, the service channel, the in-vehicle unit 4 can receive a WSA transmitted via the control channel and designate the service channel identified from the WSA as the communication channel of the first wireless communicator 42. This helps prevent the communication channel of the first wireless communicator 42 from failing to be set to the service channel identified from the WSA.

In addition, according to the present embodiment, when the determination at S10 in FIG. 11 is made NO and the determination at S12 is made YES, and the determination at S14 is made NO, enqueueing is executed at S16. In addition, the same process is executed also in FIG. 13. Thus, in the present embodiment, suppose that the first communication control unit 411 or the second communication control unit 413 determines that a WSA received by the control-target wireless communicator of either the first wireless communicator 42 or the second wireless communicator 43 is not a self-use WSA (i.e., determines that the received WSA is a WSA for the opponent party) and, simultaneously, determines that the opponent party is not executing the service identified from the received WSA. In such a case, the first communication control unit 411 or the second communication control unit 413 enqueues the received WSA. This can suppress the unnecessary WSA from being stored in the queue 41M1, 41M2.

In addition, in the present embodiment, the second communication control unit 413 can designate, as the communication channel, the service channel as well as the control channel. This allows the in-vehicle unit 4 according to the present embodiment to execute two services simultaneously.

Further, both the first communication control unit 411 and the second communication control unit 413 execute FIG. 11. Even when the control-target wireless communicator 42, 43 receives a WSA, each of the first communication control unit 411 and the second communication control unit 413 thus enqueues the received WSA based on that the received WSA is a WSA for the opponent party. This can suppress the communication channels of the first wireless communicator 42 and the second wireless communicator 43 from not being set to the service channel identified from the WSA when either the first wireless communicator 42 or the second wireless communicator 43 cannot receive the WSA.

In addition, in the present embodiment, when it is determined that the service is completed, FIG. 11 is executed again. Then, when it is determined at S4 that the self-use queue stores a WSA, the WSA is acquired from the queue. Therefore, after the communication for executing a certain service is completed, another service corresponding to the WSA stored in the queue can be executed promptly while performing the communication for executing the certain service.

In addition, in the present embodiment, when the retention time of a WSA exceeds the deletion time in the queue update process in FIG. 15, this WSA is deleted. There may be a case that because a time elapses since reception of a WSA, the service identified from the WSA becomes unnecessary. The above configuration suppresses such occurrence of executing the service that already becomes unnecessary.

In addition, the queue update process determines the deletion time depending on the service ID, i.e., depending on every kind of service. In detail, the deletion time is longer as the service represented with the service ID is more important. This suppresses an important service from failing to be executed while suppressing an unnecessary service from being executed.

Second Embodiment

The following explains a second embodiment. In the explanation of the second embodiment, an element may be assigned with the reference number identical to that of the element explained in the first embodiment unless otherwise specifically described. When only part of the configuration of the second embodiment is explained, the other part of the configuration may adopt those of the first embodiment previously explained.

In the first embodiment, the service channel which the first wireless communicator 42 can designate as the communication channel is not overlapped with the service channel which the second wireless communicator 43 can designate as the communication channel. In the second embodiment, as illustrated in FIG. 18, the service channels designated by the first wireless communicator 42 as the communication channel are the same as those in the first embodiment. In contrast, the second wireless communicator 43 can designate all the service channels SCH1 to SCH4 as the communication channel. In the second embodiment, the service channel which the first wireless communicator 42 can thus designate as the communication channel can be also designated by the second wireless communicator 43 as the communication channel.

Figure 19:
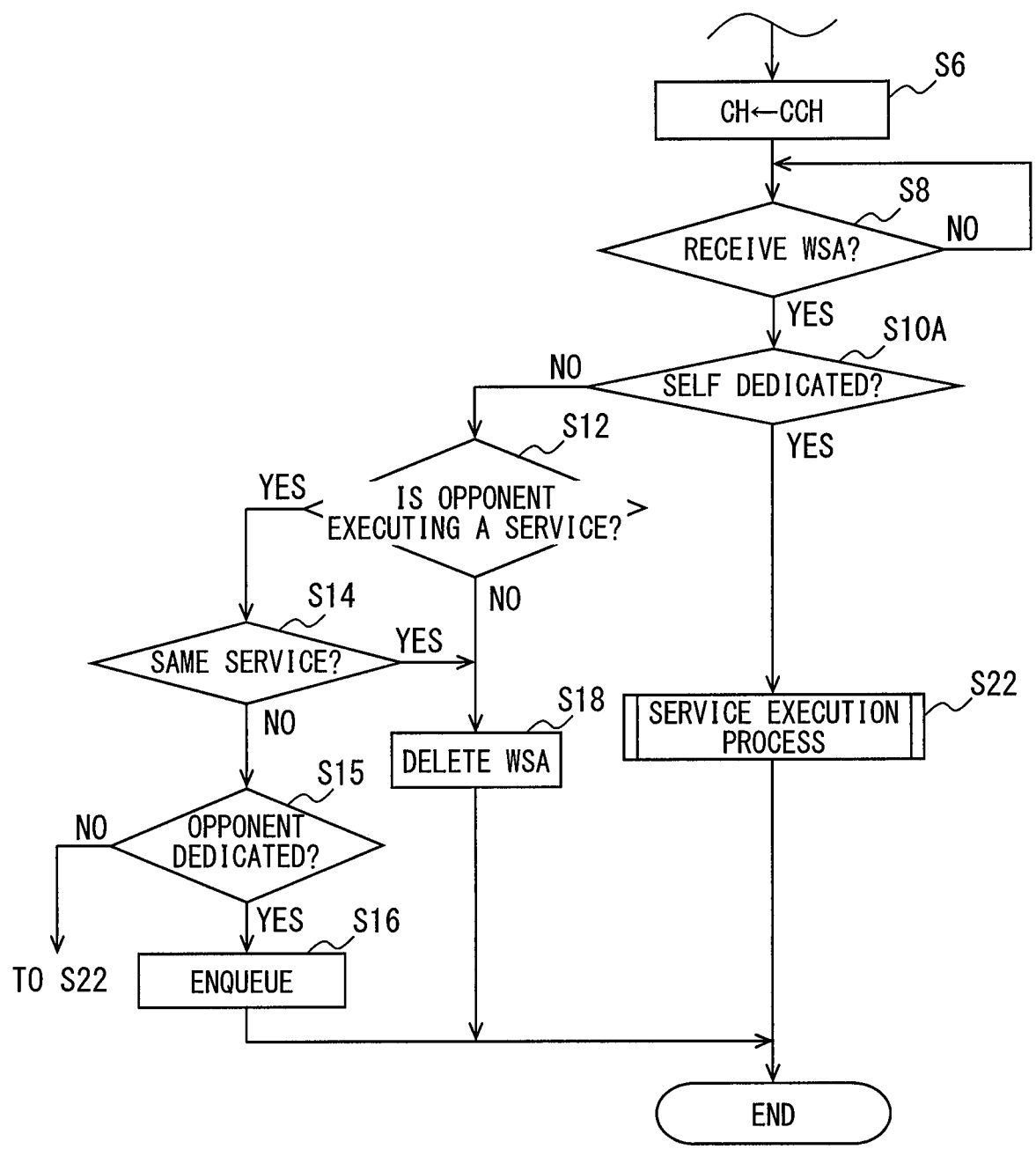
FIG. 19 is a flowchart illustrating a process executed as substitute for FIG. 11, according to a second embodiment.

FIG. 19 illustrates a process executed in the second embodiment as substitute for FIG. 11 in the first embodiment. The processes omitted in FIG. 17 are the same processes as FIG. 11. The difference between FIG. 19 and FIG. 11 is of two points. The first point is that FIG. 19 executes S10A as substitute of S10 in FIG. 11. The second point is that FIG. 19 includes S15. The other processes in FIG. 19 are the same as FIG. 11.

The following explains such two points of the difference from FIG. 11. When it is determined at S8 that a WSA is received, S10A is executed which determines whether the WSA is dedicated for itself. As in FIG. 18, the third service channel SCH3 and the fourth service channel SCH4 each are a communication channel that only the second wireless communicator 43 is enabled to designate. That is, the third service channel SCH3 and the fourth service channel SCH4 each are a dedicated channel for only the second wireless communicator 43. In contrast, in the present embodiment, the first wireless communicator 42 has no dedicated channel.

Suppose that the second communication control unit 413 executes the process in FIG. 19, while the channel information of a WSA received by the second wireless communicator 43 includes the third service channel SCH3 or the fourth service channel SCH4. In such a case only, the determination at S10A is made YES; in other cases, the determination at S10A is made NO. When the determination at S10A is made YES, the sequence proceeds to S22; when NO, it proceeds to S12.

The determination at S12 is made YES, and then the determination at S14 is made NO. This determines that the opponent party is not executing the same service as a service identified from the service ID of the WSA that is determined to be received at S8, thereby advancing the processing to S15.

At S15, it is determined whether the WSA determined to be received at S8 is dedicated for only the opponent party. When this determination is made YES, the processing proceeds to S16, where the WSA determined to be received at S8 is stored in the queue for the opponent party.

When the determination at S15 is made NO, the sequence proceeds to S22. When executing S15, the communication channel, which is fixed to the control channel, is in a state of not executing any service execution process. In addition, the WSA received is not a WSA dedicated for only the opponent party; the service identified from the WSA can be executed. Then, also when the determination at S15 is made NO, the sequence proceeds to S22, where the service execution process is executed by itself.

Figure 20:
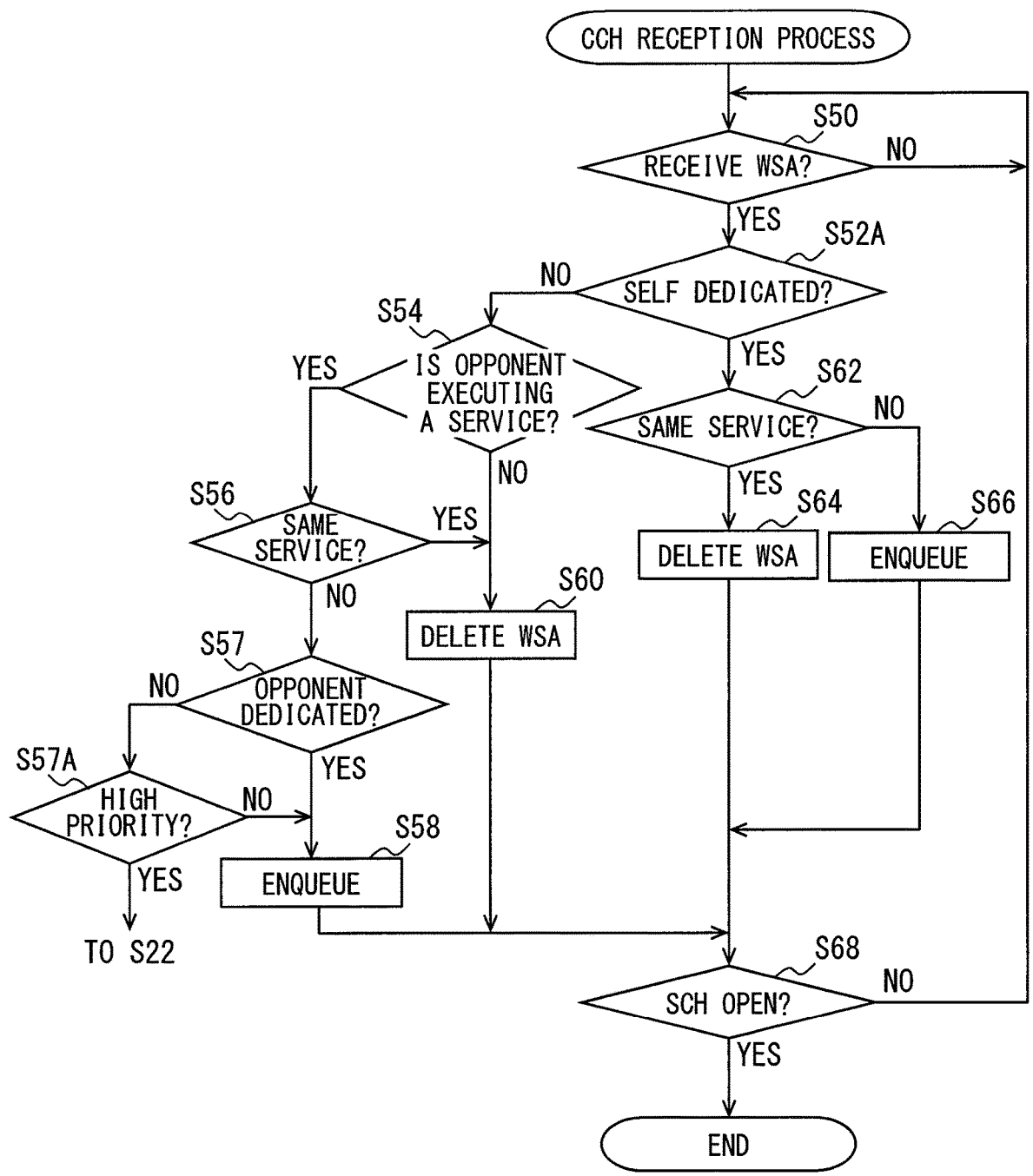
FIG. 20 is a flowchart illustrating a process executed as substitute for FIG. 13, according to the second embodiment.

The following explains FIG. 20. FIG. 20 illustrates a process executed in the second embodiment as substitute for FIG. 13 in the first embodiment. The difference between FIG. 20 and FIG. 13 is of three points. The first point is that in FIG. 20, S52A is executed as substitute for S52 in FIG. 13. The second point is that FIG. 20 includes S57. The third point is that FIG. 20 includes S57A. The other processes in FIG. 20 is the same as FIG. 13.

The following explains such three points as the difference from FIG. 13. At S52A, it is determined whether the WSA determined to be received at S50 is dedicated for itself. This processing at S52A is similar to the processing at S10A in FIG. 19.

At S57, it is determined whether the WSA determined to be received at S50 is dedicated for only the opponent party. This processing at S57 is the same as the processing at S15 in FIG. 19.

When the determination at S57 is made YES, the sequence proceeds to S58. When the determination at S57 is made NO, the sequence proceeds to S57A.

The CCH reception process in FIG. 20 is a part of the service execution process in FIG. 12. That is, in the state of executing FIG. 20, the first communication control unit 411 or the second communication control unit 413 that is executing this FIG. 20 also performs the service execution process.

Thus, at S57A, it is determined whether the priority included in the service information of the WSA is higher than the priority of the service currently executed. When this determination is made NO, the sequence proceeds to S58. In contrast, when the determination at S57A is made YES, the sequence proceeds to S22. At S22 following the determination at 557A being made YES, the service indicated by the WSA determined to be received at S50 is executed without waiting for the completion of the service under execution.

[Time Variation of Communication Channels in Second Embodiment]

Figure 21:
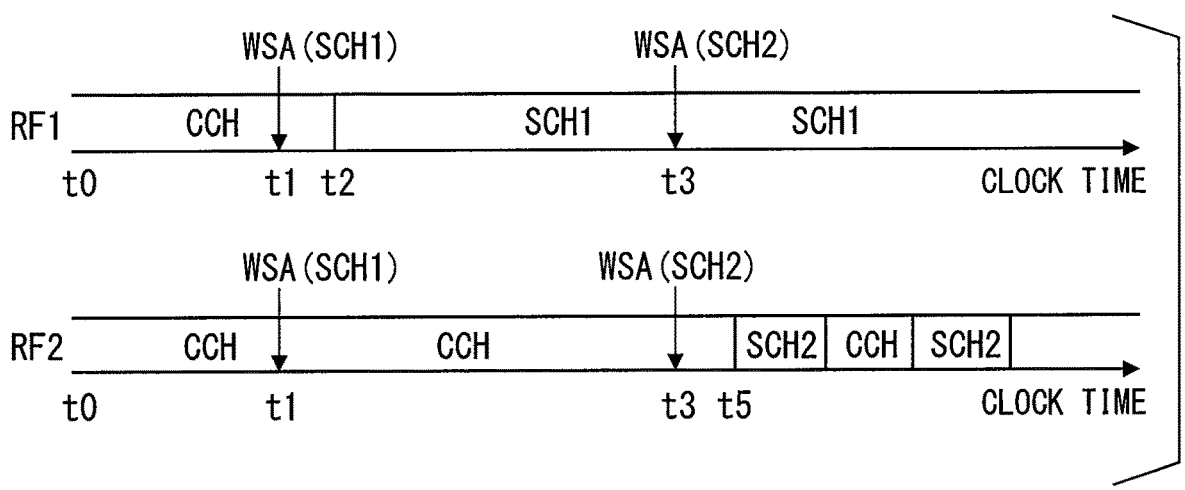
FIG. 21 is a diagram illustrating a time variation of communication channels of a first wireless communicator and a second wireless communicator according to the second embodiment.
Figure 22:
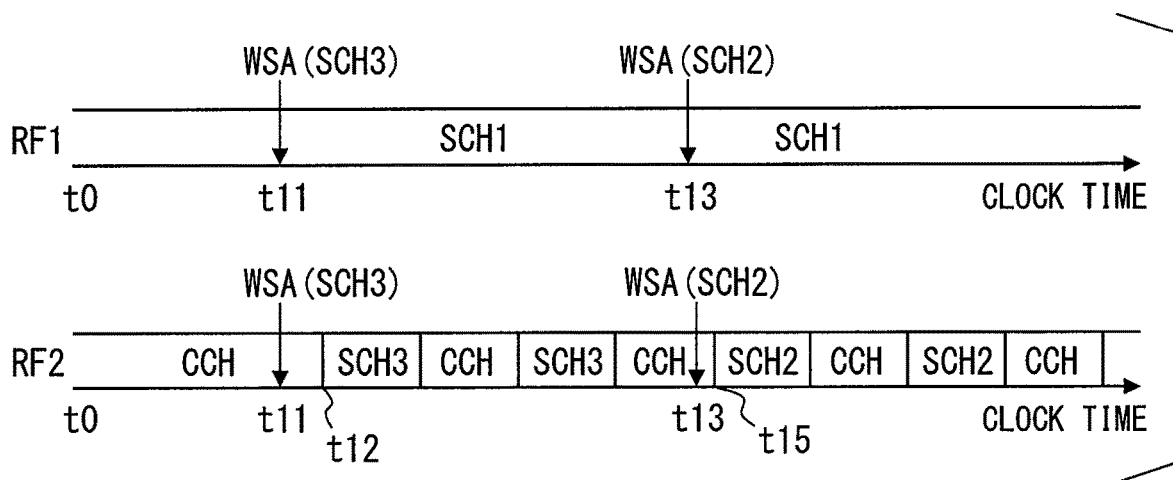
FIG. 22 is a diagram illustrating a time variation of communication channels of a first wireless communicator and a second wireless communicator according to the second embodiment.

Each of FIG. 21 and FIG. 22 is a diagram illustrating a time variation of communication channels of the first wireless communicator 42 and the second wireless communicator 43 according to the second embodiment. In FIG. 21 and FIG. 22, the meanings of RF1, RF2, CCH, and SCH are the same as FIG. 16 and FIG. 17. In addition, the clock time t0 is the time of being powered on.

In the example of FIG. 21, the time variation up to the clock time t3 is the same as the example of FIG. 16. At the clock time t3, the second wireless communicator 43 receives a WSA including the second service channel SCH2 as the channel information. In the second embodiment, the second wireless communicator 43 can also designate the second service channel SCH2 as the communication channel. Therefore, in the example of FIG. 21, at the clock time t5 the second communication control unit 413 causes the second wireless communicator 43 to designate, as the communication channel, the second service channel SCH2.

In the example in FIG. 21, differently from the example in FIG. 16, the communication designating, as the communication channel, the second service channel SCH2 can be started without waiting for the completion of the communication designating, as the communication channel, the first service channel SCH1. Thus, the clock time t5 is earlier than the clock time t4 in FIG. 16. That is, the service identified from the WSA received at the clock time t3 can be executed promptly.

The following explains an example in FIG. 22. In the example in FIG. 22, the time variation up to the clock time t13 is the same as the example of FIG. 17. At the clock time t13, the second wireless communicator 43 receives a WSA including the second service channel SCH2 as the channel information. In the second embodiment, the second wireless communicator 43 can also designate the second service channel SCH2 as the communication channel. In addition, suppose that the service performed using the second service channel SCH2 has a priority higher than that of the service performed using the third service channel SCH3. In such a case, at the clock time t13, the determination at S57A in FIG. 20 is made YES. Thereby, at the clock time t15, even though still executing the service using the third service channel SCH3, the second communication control unit 413 causes the second wireless communicator 43 to designate, as the communication channel, the second service channel SCH2. That is, the service identified from the WSA received at the clock time t13 can be executed promptly.

Summary of Second Embodiment

The second embodiment provides the following. The second communication control unit 413 may receive a WSA (S8: YES) while continuing designating the control channel as the communication channel of the second wireless communicator 43 without executing any service execution process. In such a case, it is determined whether the first wireless communicator 42 designates a different service channel that is different from the service channel identified from the WSA (S14).

In the second embodiment, the second wireless communicator 43 can designate all the service channels as the communication channel. Therefore, the determination at S15, which is executed when the determination at S14 is made NO, is made YES, and the service execution process is performed. When the first wireless communicator 42 is opening a certain service channel, the in-vehicle unit 4 may receive a WSA needing to open a different service channel which can be opened by the first wireless communicator 42. In such a case, the communication channel of the second wireless communicator 43 may be set to such a different service channel, allowing the service execution process to be performed. That is, the service identified from the WSA can be executed promptly.

Furthermore, even while executing the service execution process, the second communication control unit 413 may receive a WSA (S50: YES) when designating, as the communication channel of the second wireless communicator 43, the control channel. In such a case, it is determined whether the first wireless communicator 42 designates a different service channel that is different from the service channel identified from the WSA (S56).

As explained above, in the second embodiment, the second wireless communicator 43 can designate all the service channels as the communication channel. When the determination at S56 is made NO, the determination at S57 is made YES and the determination at S57A is performed. When the priority included in the service information of the WSA is higher than the priority of the service executed currently (S57 A: YES), the service execution process is performed in order to execute the service indicated by the WSA (S22).

This allows the service identified from a WSA to be executed promptly when the second wireless communicator 43 receives the WSA indicating the service with a high priority even in cases that the first communication control unit 411 is executing some service and the second communication control unit 413 is also executing some service.

The embodiment of the present disclosure is described in the above; however, the present disclosure is not limited to the above embodiment. The following modification is also included in the technical scope of the present disclosure; furthermore, another modification other than the following is also included in the technical scope of the present disclosure as long as not deviating from the technical subject matter.

<First Modification>

For example, in the above-mentioned embodiments, when a WSA is acquired from the queue 41M1 and 41M2 and a plurality of WSAs are stored in the queue 41M1 and 41M2, the WSA having the oldest reception clock time is acquired. However, without being limited to this, the WSA with the highest priority among a plurality of WSAs stored in the queue 41M1 and 41M2 may be acquired. Although this priority is included in the WSA in the above-mentioned embodiments, the relation specifying the priority from the service ID may be stored in the memory 41M of the in-vehicle unit 4 and the priority may be determined from the service ID included in WSA and the relation.

<Second Modification>

In the above-mentioned embodiments, the first wireless communicator 42 and the second wireless communicator 43 can designate the control channel as the communication channel. However, either the first wireless communicator 42 or the second wireless communicator 43 may be enabled to designate a plurality of service channels as the communication channel, and be disabled to designate the control channel as the communication channel.

<Third Modification>

The service ID corresponds to the service channel. When the in-vehicle unit 4 stores the correspondence relation from which the service channel is identified from the service ID, the service ID included in the WSA may be used as the channel information.

<Fourth Modification>

In the second embodiment, the second wireless communicator 43 can designate, as the communication channel, all the service channels which the first wireless communicator 42 can designate as the communication channel. However, the second wireless communicator 43 may designate, as the communication channel, only part of all the service channels which the first wireless communicator 42 can designate as the communication channel.

<Fifth Modification>

At the second embodiment, S57A in FIG. 20 compares the priority of the service under execution with the priority of the service indicated by the WSA. When the priority of the service indicated by the WSA is higher, the service execution process is executed. However, an additional comparison may be made between the priority of the service indicated by the WSA and a priority threshold value specified previously. When the priority of the service indicated by the WSA is higher than the priority threshold value, the service execution process may be executed. This enables only an important service to be selected as the service that is started by daring to interrupt the service under execution.

<Sixth Modification>

In the above-mentioned embodiments, whenever the determination at S14 or S56 is made NO, the received WSA is stored always in the queue. However, when the information which indicates an immediate opening of the service channel is included in the received WSA, the service channel indicated by the WSA may be immediately opened, without storing the WSA in the queue.

<Seventh Modification>

In the above-mentioned embodiments, although the deletion time is determined depending on each service, the deletion time may be a uniform time regardless of the service.

<Eighth Modification>

In the above-mentioned embodiments, the service channel and the control channel are 5.8 GHz band or 5.9 GHz band. However, those channels may be achieved using the frequency belonging to 2.4 GHz band, or the frequency belonging to other frequency band.

<Ninth Modification>

Although the wireless communication system 1 is provided with the announcement roadside unit 2, the non-announcement roadside unit 3, and the in-vehicle unit 4, the wireless communication system may be configured not to include any non-announcement roadside unit 3.

Although the present disclosure is described based on the embodiment, it is understood that the present disclosure does not need to be limited to the embodiment or its configuration. The present disclosure also includes various modification examples and modifications within a scope of an equivalent. In addition, various combinations or embodiments, and other combinations or embodiments which contain only a single element, more than one element, or less than it may be included within a scope or concept of the present disclosure.

What is claimed is:

1. A wireless communication device for vehicles, the wireless communication device receiving information using a plurality of service channels and a control channel, the plurality of service channels and the control channel which are assigned with a plurality of mutually different frequency channels, the wireless communication device comprising:

a first wireless receiver that designates, as a first reception channel, a service channel identified from the plurality of service channels based on a kind of a service, and receives service execution information to execute the service;

a second wireless receiver that designates, as a second reception channel, the control channel, and receives service announcement information including channel information identifying the service channel; and a reception control unit that causes the first wireless receiver to set the first reception channel based on the channel information included in the service announcement information received by the second wireless receiver, wherein the first wireless receiver is enabled to also designate the control channel as the first reception channel; and the reception control unit causes the first wireless receiver to designate the control channel as the first reception channel, when any service channel is not designated as the first reception channel of the first wireless receiver.

2. The wireless communication device for vehicles according to claim 1, further comprising:

a storage that stores the service announcement information received by the second wireless receiver, wherein the reception control unit acquires the channel information included in the service announcement information, from the storage, and causes the first wireless receiver to set the first reception channel based on the acquired channel information.

3. The wireless communication device for vehicles according to claim 1, further comprising:

a first reception control unit that serves as the reception control unit; and a second reception control unit that controls the second reception channel of the second wireless receiver, wherein:

the second wireless receiver to designate at least one service channel among the plurality of service channels in addition to the control channel, as the second reception channel; and the second reception control unit causes the second wireless receiver to designate the service channel identified from the channel information as the second reception channel, based on that the service channel identified from the channel information included in the service announcement information received by the second wireless receiver to be designated by the second wireless receiver as the second reception channel.

4. A wireless communication system comprising:

a wireless communication device for vehicles according to claim 1; and an announcement roadside unit that transmits the service announcement information, in addition to the service execution information.

5. The wireless communication device for vehicles according to claim 2, further comprising:

a storage control unit configured to store the service announcement information in the storage in response to (i) enabling the service channel identified from the channel information included in the service announcement information and received by the second wireless receiver to be designated by the first wireless receiver as the first reception channel, and (ii) the first wireless receiver designating a different service channel that is different from the service channel identified from the channel information included in the service announcement information received by the second wireless receiver.

6. The wireless communication device for vehicles according to claim 3, wherein:

the second wireless receiver to designate at least one of the plurality of service channels enabled to be designated by the first wireless receiver as the second reception channel of the second wireless receiver; and the second reception control unit causes the second wireless receiver to designate, as the second reception channel, the service channel identified from the channel information included in the service announcement information received by the second wireless receiver when the second wireless receiver is designating the control channel as the second reception channel, based on (i) that the first wireless receiver is designating a different service channel that is different from the service channel identified from the channel information included in the service announcement information, and (ii) that the service channel identified from the channel information included in the service announcement information to be designated as the first reception channel by the first wireless receiver and the second reception channel by the second wireless receiver.

7. The wireless communication system according to claim 4, further comprising:
a non-announcement roadside unit that transmits the service execution information, without transmitting the service announcement information.

8. The wireless communication device for vehicles according to claim 5,
wherein:
the service announcement information includes the channel information, information identifying a kind of a service, and information specifying a priority of the service;
based on
(i) that the service announcement information is stored in the storage, and
(ii) that a service identified from the service announcement information received by the second wireless receiver is different from a service identified from the service announcement information stored in the storage,
the storage control unit stores the service announcement information received by the second wireless receiver in the storage while the storage control unit continues storing the service announcement information already stored in the storage; and
when a plurality of service announcement informations are stored in the storage, the reception control unit causes the first wireless receiver to designate, as the first reception channel, the service channel identified from the service announcement information having a highest priority.

9. The wireless communication device for vehicles according to claim 5, wherein:
the reception control unit acquires the service announcement information from the storage after the first wireless receiver receives the service execution information indicating completion of the service based on the service announcement information being stored in the storage; and
the storage control unit deletes the service announcement information from the storage based on that a period of time for which the service announcement information is stored in the storage exceeds a deletion time.

10. The wireless communication device for vehicles according to claim 6, wherein:
the second wireless receiver to designate as the second reception channel, in addition to the control channel, two or more service channels that contain at least one of the plurality of service channels that are enabled to be designated by the first wireless receiver;
the second reception control unit causes the second wireless receiver to designate, as the second reception channel, alternately (i) the control channel and (ii) one service channel of the two or more service channels; and
the second wireless receiver receives the service execution information when the second wireless receiver is designating the one service channel as the second reception channel;

the second wireless receiver receives the service announcement information when the second wireless receiver is designating the control channel as the second reception channel;
the first wireless receiver is designating a different service channel that is different from the service channel identified from the channel information included in the service announcement information received by the second wireless receiver;
the second wireless receiver to designate, as the second reception channel, the service channel included in the service announcement information received by the second wireless receiver; and
based on that a priority of a service identified from the channel information included in the service announcement information received by the second wireless receiver when the second wireless receiver is designating, as the second reception channel, the control channel is higher than a priority of a service identified from the service execution information received by the second wireless receiver when the second wireless receiver is designating, as the second reception channel, the one service channel of the two or more service channels,
the second reception control unit causes the second wireless receiver to designate, as the second reception channel, the service channel identified from the channel information included in the service announcement information received by the second wireless receiver when the second wireless receiver is designating the control channel as the second reception channel.

11. The wireless communication device for vehicles according to claim 9, wherein:
in addition to the channel information, the service announcement information includes information identifying a kind of a service; and
the storage control unit specifies the deletion time that is specified depending on the kind of the service identified from the service announcement information.

12. A wireless communication device for vehicles, the wireless communication device receiving information using a plurality of service channels and a control channel, the plurality of service channels and the control channel which are assigned with a plurality of mutually different frequency channels,
the wireless communication device comprising:
a first wireless receiver that designates, as a first reception channel, a service channel identified from the plurality of service channels based on a kind of a service, and receives service execution information to execute the service;
a second wireless receiver that designates, as a second reception channel, the control channel, and receives service announcement information including channel information identifying the service channel;
a reception control unit that causes the first wireless receiver to set the first reception channel based on the channel information included in the service announcement information received by the second wireless receiver;
a first reception control unit that serves as the reception control unit; and
a second reception control unit that controls the second reception channel of the second wireless receiver,
wherein:

the second wireless receiver to designate at least one service channel among the plurality of service channels in addition to the control channel, as the second reception channel; and the second reception control unit causes the second wireless receiver to designate the service channel identified from the channel information as the second reception channel, based on that the service channel identified from the channel information included in the service announcement information received by the second wireless receiver to be designated by the second wireless receiver as the second reception channel.

13. The wireless communication device for vehicles according to claim 12, wherein:

the second wireless receiver to designate at least one of the plurality of service channels enabled to be designated by the first wireless receiver as the second reception channel of the second wireless receiver; and the second reception control unit causes the second wireless receiver to designate, as the second reception channel, the service channel identified from the channel information included in the service announcement information received by the second wireless receiver when the second wireless receiver is designating the control channel as the second reception channel, based on
(i) that the first wireless receiver is designating a different service channel that is different from the service channel identified from the channel information included in the service announcement information, and
(ii) that the service channel identified from the channel information included in the service announcement information to be designated as the first reception channel by the first wireless receiver and the second reception channel by the second wireless receiver.

14. A wireless communication system comprising:

a wireless communication device for vehicles according to claim 12; and an announcement roadside unit that transmits the service announcement information, in addition to the service execution information.

15. The wireless communication device for vehicles according to claim 13, wherein:

the second wireless receiver to designate as the second reception channel, in addition to the control channel, two or more service channels that contain at least one of the plurality of service channels that are enabled to be designated by the first wireless receiver;

the second reception control unit causes the second wireless receiver to designate, as the second reception channel, alternately (i) the control channel and (ii) one service channel of the two or more service channels; and the second wireless receiver receives the service execution information when the second wireless receiver is designating the one service channel as the second reception channel;

the second wireless receiver receives the service announcement information when the second wireless receiver is designating the control channel as the second reception channel;

the first wireless receiver is designating a different service channel that is different from the service channel identified from the channel information included in the service announcement information received by the second wireless receiver;

the second wireless receiver to designate, as the second reception channel, the service channel included in the service announcement information received by the second wireless receiver; and based on that a priority of a service identified from the channel information included in the service announcement information received by the second wireless receiver when the second wireless receiver is designating, as the second reception channel, the control channel is higher than a priority of a service identified from the service execution information received by the second wireless receiver when the second wireless receiver is designating, as the second reception channel, the one service channel of the two or more service channels, the second reception control unit causes the second wireless receiver to designate, as the second reception channel, the service channel identified from the channel information included in the service announcement information received by the second wireless receiver when the second wireless receiver is designating the control channel as the second reception channel.

16. The wireless communication system according to claim 14, further comprising:

a non-announcement roadside unit that transmits the service execution information, without transmitting the service announcement information.

* * * * *